United States Patent
deMayo

(10) Patent No.: US 9,688,922 B2
(45) Date of Patent: Jun. 27, 2017

(54) METHOD AND DEVICE FOR EXTRACTION OF LIQUIDS FROM A SOLID PARTICLE MATERIAL

(71) Applicant: Benjamin deMayo, Carrollton, GA (US)

(72) Inventor: Benjamin deMayo, Carrollton, GA (US)

(*) Notice: Subject to any disclaimer, the term of this patent is extended or adjusted under 35 U.S.C. 154(b) by 626 days.

(21) Appl. No.: 14/299,986

(22) Filed: Jun. 9, 2014

(65) Prior Publication Data

US 2014/0360923 A1    Dec. 11, 2014

Related U.S. Application Data

(63) Continuation-in-part of application No. 12/855,267, filed on Aug. 12, 2010, now abandoned.

(60) Provisional application No. 61/233,241, filed on Aug. 12, 2009.

(51) Int. Cl.
| | |
|---|---|
| *C10G 31/10* | (2006.01) |
| *C10G 1/00* | (2006.01) |
| *B04B 3/00* | (2006.01) |
| *B01D 21/00* | (2006.01) |
| *B01D 21/26* | (2006.01) |
| *B03B 9/02* | (2006.01) |
| *B04B 3/02* | (2006.01) |
| *B04B 3/04* | (2006.01) |
| *B04B 5/04* | (2006.01) |
| *B04B 15/02* | (2006.01) |
| *B01L 3/00* | (2006.01) |

(52) U.S. Cl.
CPC ........... *C10G 31/10* (2013.01); *B01D 21/009* (2013.01); *B01D 21/262* (2013.01); *B03B 9/02* (2013.01); *B04B 3/00* (2013.01); *B04B 3/025* (2013.01); *B04B 3/04* (2013.01); *B04B 5/0414* (2013.01); *B04B 5/0421* (2013.01); *B04B 15/02* (2013.01); *C10G 1/00* (2013.01); *B01D 2221/04* (2013.01); *B01L 3/5021* (2013.01); *B04B 2005/0435* (2013.01)

(58) Field of Classification Search
CPC . C10G 1/00; C10G 1/04; C10G 1/045; C10G 1/047; B04B 3/00
See application file for complete search history.

(56) References Cited

U.S. PATENT DOCUMENTS

| | | |
|---|---|---|
| 1,718,141 A | 6/1929 | Hall |
| 2,320,106 A | 5/1943 | South |
| 2,840,240 A | 6/1958 | Snyder |
| 2,871,180 A | 1/1959 | Lowman, Jr. et al. |

(Continued)

OTHER PUBLICATIONS

Budziak, Study of fines in bitumen extracted from oil sands by heat centrifugation, 1988 Fuel vol. 67 December pages 633-1638.

*Primary Examiner* — Renee Robinson

(57) ABSTRACT

A method, system, and device for separating oil from oil sands or oil shale is disclosed. The method includes heating the oil sands, spinning the heated oil sands, confining the sand particles mechanically, and recovering the oil substantially free of the sand. The method can be used without the addition of chemical extraction agents. The system includes a source of centrifugal force, a heat source, a separation device, and a recovery device. The separation device includes a method of confining the sands while allowing the oil to escape, such as through an aperture.

7 Claims, 42 Drawing Sheets

(56) References Cited

U.S. PATENT DOCUMENTS

| | | |
|---|---|---|
| 3,161,581 A | 12/1964 | Tiedje et al. |
| 3,466,240 A | 9/1969 | Steinmetz |
| 3,530,041 A | 9/1970 | Erskine et al. |
| 3,891,550 A | 6/1975 | Gray et al. |
| 3,893,907 A | 7/1975 | Canevari |
| 3,951,749 A | 4/1976 | Fairbanks, Jr. et al. |
| 3,953,317 A | 4/1976 | Myers et al. |
| 4,029,568 A | 6/1977 | Pittman et al. |
| 4,110,194 A | 8/1978 | Peterson et al. |
| 4,110,195 A | 8/1978 | Harding |
| 4,224,138 A | 9/1980 | Kruyer |
| 4,240,897 A | 12/1980 | Clarke |
| 4,250,016 A | 2/1981 | Estes et al. |
| 4,338,185 A | 7/1982 | Noelle |
| 4,347,971 A | 9/1982 | Novoselac |
| 4,459,200 A | 7/1984 | Dente et al. |
| 4,498,971 A | 2/1985 | Angelov et al. |
| 4,515,685 A | 5/1985 | Yeh |
| 4,533,459 A | 8/1985 | Dente et al. |
| 4,704,200 A | 11/1987 | Keane |
| 4,906,355 A | 3/1990 | Lechnick et al. |
| 4,966,685 A | 10/1990 | Hall et al. |
| 5,122,259 A | 6/1992 | Nielson |
| 5,223,148 A | 6/1993 | Tipman |
| 5,320,746 A | 6/1994 | Green et al. |
| 5,340,467 A | 8/1994 | Gregoli |
| 5,520,605 A * | 5/1996 | Leung ............... B04B 1/20 494/50 |
| 5,626,743 A | 5/1997 | Humphreys |
| 5,762,780 A | 6/1998 | Rendall et al. |
| 5,770,049 A | 6/1998 | Humphreys |
| 5,795,444 A | 8/1998 | Rendall et al. |
| 5,876,592 A | 3/1999 | Tipman et al. |
| 5,985,138 A | 11/1999 | Humphreys |
| 6,004,455 A | 12/1999 | Rendall |
| 6,119,870 A | 9/2000 | Maciejewski et al. |
| 6,214,213 B1 | 4/2001 | Tipman et al. |
| 6,251,290 B1 | 6/2001 | Conaway |
| 6,576,145 B2 | 6/2003 | Conaway et al. |
| 7,192,092 B2 | 3/2007 | Watson |
| 2001/0030145 A1 | 10/2001 | Conaway |
| 2002/0003115 A1 | 1/2002 | Conaway et al. |
| 2004/0035755 A1 | 2/2004 | Reeves |
| 2004/0129646 A1 | 7/2004 | Conaway et al. |
| 2006/0016760 A1 | 1/2006 | Bozack et al. |
| 2006/0138055 A1 | 6/2006 | Garner et al. |
| 2007/0131590 A1 | 6/2007 | Bozack et al. |
| 2007/0181465 A1 | 8/2007 | Collette |
| 2007/0205141 A1 | 9/2007 | Freeman et al. |
| 2008/0000810 A1 | 1/2008 | Garner et al. |
| 2008/0035531 A1 | 2/2008 | Coveley |

* cited by examiner

US 9,688,922 B2

METHOD AND DEVICE FOR EXTRACTION OF LIQUIDS FROM A SOLID PARTICLE MATERIAL

RELATED APPLICATIONS

The present patent document is a division of patent application Ser. No. 12/855,267 filed Aug. 12, 2010, which claims the benefit of the filing date under 35 U.S.C. §119(e) of Provisional U.S. Patent Application Ser. No. 61/233,241, filed Aug. 12, 2009, each of which are hereby incorporated by reference in their entirety.

FEDERALLY SPONSORED RESEARCH OR DEVELOPMENT

This invention was made with Government support under contract NNG05GJ65H, awarded by NASA. The Government has certain rights in this invention.

BACKGROUND

Given high oil prices and the finite amount of crude oil available, unconventional petroleum reserves in the form of, for example, oil sands and oil shale are becoming more attractive as an alternative source of hydrocarbons. Oil sands are found in over 60 countries in the world, including the United States. The main deposits occur in Alberta, Canada, and represent the second largest reserves of petroleum in the world, after those in Saudi Arabia.

BRIEF SUMMARY

This invention relates to a process for extracting liquids, such as bitumen or crude oil, from discrete solid particles, such as sand or shale. The invention is particularly applicable to oil sands and oil shale in which oil is present as a highly viscous liquid.

BRIEF DESCRIPTION OF THE DRAWINGS

The physical process for extracting liquid such as oil from the solid-liquid mixture such as oil sands or oil shale involves submitting the heated mixture to centrifugal forces to allow the liquid to mechanically separate from the solid particles and exit the device through small apertures.

DETAILED DESCRIPTION

Figure 1:
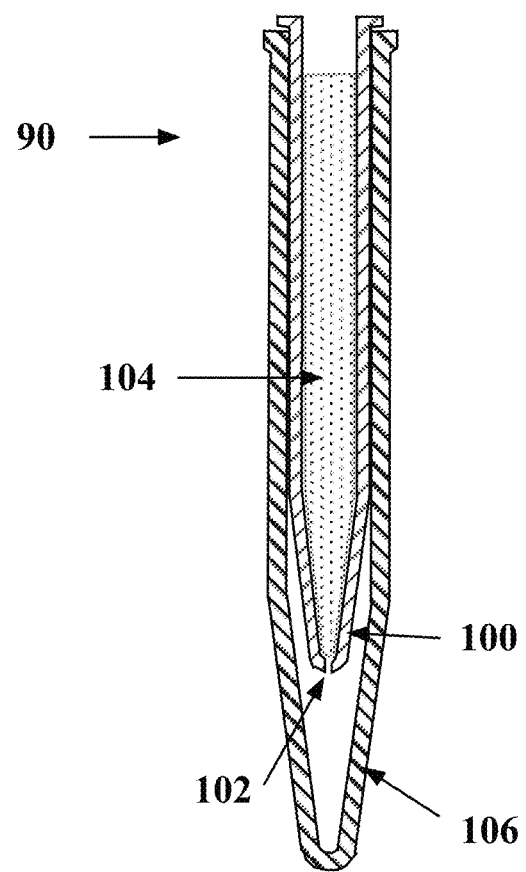
FIG. 1 is a cross-sectional view of a first system.

Oil sands (also referred to as tar sands) are found in over sixty countries in the world, including the United States. Oil sands consist mainly of bitumen, water, mineral particles, sand, and clay. Bitumen is a natural, tar-like mixture of hydrocarbons that exists as a solid at room temperature. In nature, bitumen has a density range of 8° to 12° API, and at room temperature its viscosity is greater than 50,000 centipoises.

The physical process disclosed for separating liquids from solids uses fewer natural resources to produce bitumen from oil sand than the conventional method of separation. The conventional method of separating bitumen from oil sand requires more than 1,000 cubic feet of natural gas to separate one barrel of bitumen from two tons of oil sand, according to the National Energy Board of Canada. However, the physical process disclosed for separating liquids from solids requires less than 190 cubic feet of natural gas and no fresh water or other solvents to produce one barrel of bitumen.

The physical process disclosed produces a clean effluent. The only ingredient in the produced effluent is sand, which almost all of the oil is removed. On a laboratory scale, approximately over 85% of the available oil is removed. The physical process disclosed is also effective on a laboratory scale. Approximately 90% of the available oil is removed in less than 15 minutes.

The physical process disclosed is a simple mechanical method. Using less than 25% of the energy required of the conventional hot-water process method to separate oil from oil sands, the disclosed physical process is environmentally conscious.

As an illustration, the energy needed to heat oil sand is calculated by multiplying the oil sand specific heat at constant pressure by the mass of the oil sand and the change in temperature. For example, the energy needed to heat two tons (2,000 kg) of oil sand with a specific heat at constant pressure of 1 kJ/kg-K from 0° C. up to 100° C. equals 200,000 kJ. The specific heat at constant pressure of Utah oil sand ranges from 0.67 kJ/kg-K to 1.57 kJ/kg-K in the temperature range of 100-350° C. Converted to the energy units of BTU based on 1.055 kJ per BTU, 200,000 kJ equals 189,574 BTU. Each cubic foot of natural gas contains 1,028 BTU of energy, as a result, 189,574 BTU equals 184 cubic feet of natural gas. Therefore, the physical process disclosed for separating liquids from solids may require less than 190 cubic feet of natural gas to separate one barrel of bitumen from two tons of oil sand, which is 80% less than the 1,000 cubic feet used in the conventional separation method.

Additionally, the negative impact on the environment from the physical process disclosed for separating liquids from solids may be less than the conventional separation method because the physical process disclosed does not require any water to separate bitumen from oil sand. Conversely, the conventional separation process requires up to 4 barrels of fresh water to produce one barrel of bitumen from two tons of oil sand. The spent water used in the conventional oil separation process is suspected to cause environmental, wildlife, and health problems. The spent water may contain chemicals used in the conventional separation process and may enter rivers and fresh ground water supplies after leaking from spent water retention ponds. Therefore, the physical process disclosed for separating liquids from solids may be less harmful to the environment than the conventional separation method.

A physical process for separating liquids from solids is disclosed. As a non-limiting example, this physical process may be used to separate liquids, such as oil, from solid particles, such as sand or shale. The process may involve at least the following steps in any order (a) applying heat to a mixture of solids and liquids; (b) rapidly spinning the mixture; and (c) confining the solid particles mechanically.

Figure 3:
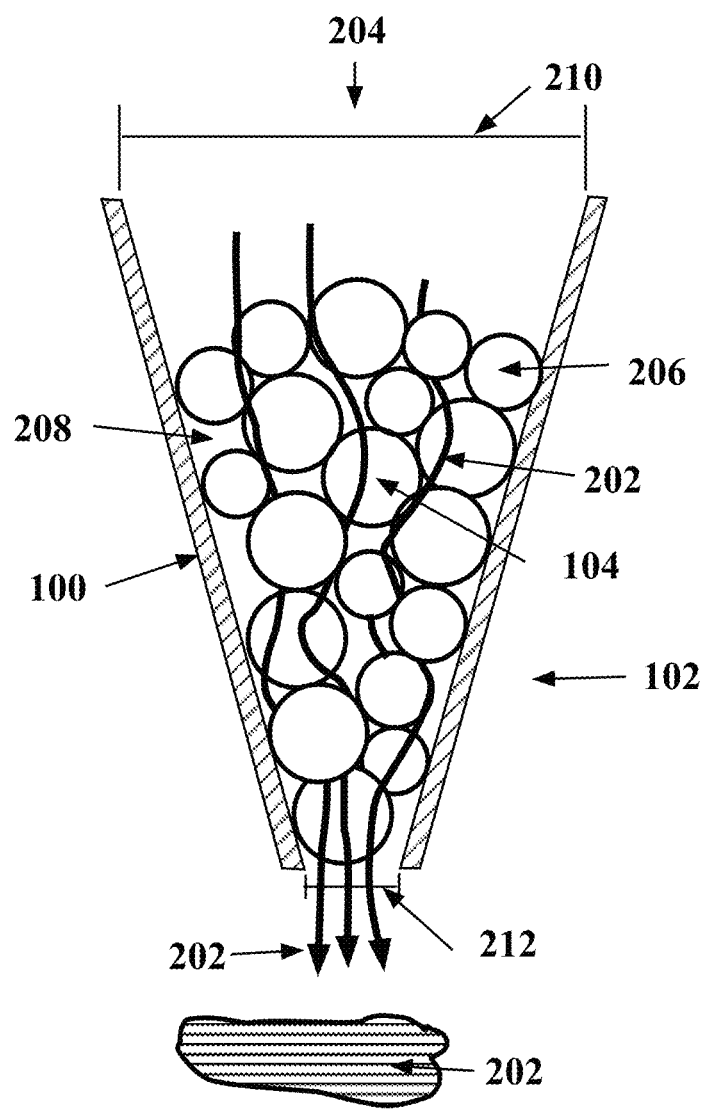
FIG. 3 is an exploded detail of the first system.

A first system includes a separation device 90 as shown in FIG. 1. The separation device 90 may be made up of one or more tubes such as test tubes. The separation device 90 may, for example, include a first tube 106 and a second tube 100. The tubes 106, 100 of this example are dimensioned such that the second tube 100 fits inside of the first tube 106, for example, in a nested conformation. The second tube 100 has an aperture 102 at one end. In this example, the aperture may have a diameter of approximately 0.40-1.50 mm, 0.45-1.35 mm, 0.80-1.30 mm, or 0.90-1.20 mm. The aperture may be funnel shaped as shown in FIG. 3, and may have a diameter that decreases from its originating point to its terminating point. However, the optimal aperture size may vary with other variables, such as the type of solid or liquid being separated or other considerations.

Figure 2:
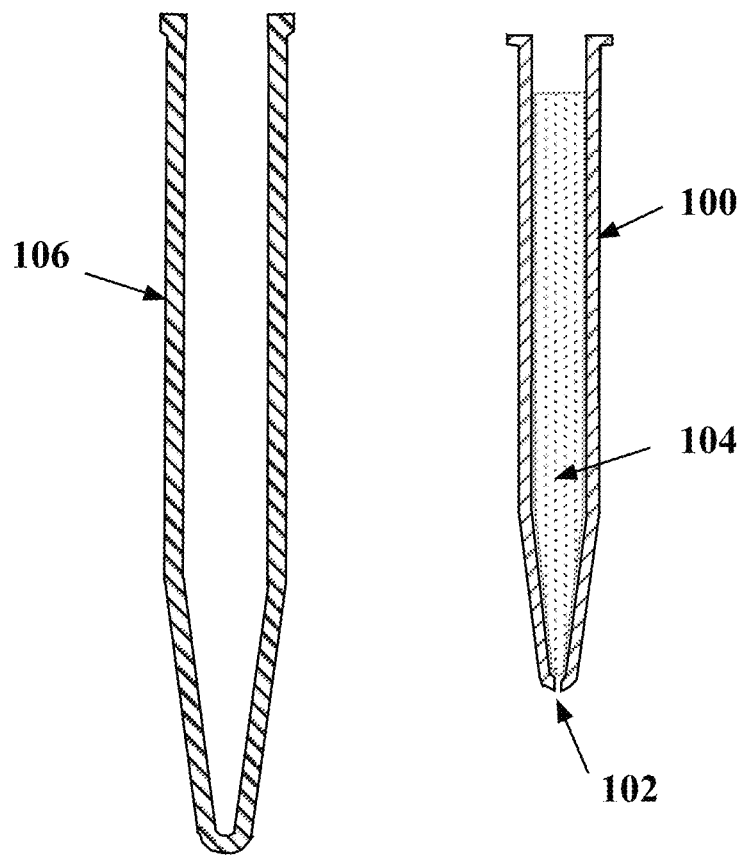
FIG. 2 is a cross-sectional view of the first system unassembled.

The separation device 90 may be dimensioned as described below and illustrated by FIG. 2. The dimensions are representative of this system but may be varied depending upon, for example the system, production needs, and type of solids and liquids being separated.

The first tube 106 of this example may be, for example but not limited to, a 15 ml centrifuge tube. The second tube 100 of this example may be, for example but not limited to, a 5 ml centrifuge tube. Again, recognized by those of ordinary skill in the art that dimensions, supply source, and specifications for the first tube 106 and the second tube 100 may be varied to suit the needs of a particular application.

The second tube 100 may have an aperture 102 at one end. The aperture may facilitate separation by retaining solids, such as sand or shale, within the second tube 100 while allowing liquids, such as oil, to escape. The aperture 102 may be added to a tube, for example, the second tube 100 using a tungsten probe. By way of example, to create an aperture, an area on the second tube 100 may be warmed and bored through with a super-heated tungsten probe. The tungsten probe may be a 1/16 inch tungsten probe which may be filed to a point. Other known methods may also be used to create an aperture 102.

The process for removing, for example, oil from sand, may proceed as follows. A solids-liquids mixture 104, for example oil shale or oil sands, may be heated to approximately 25° C.-200° C., 50° C.-175° C., 75° C.-150° C., 95° C.-125° C., and preferably approximately 92° C.-110° C. and more preferably approximately 94° C. (e.g., in a water bath). The solids-liquids mixture 104 may be heated prior to loading into the separation device 90. Alternatively, the solids-liquids mixture may be heated in the separation device, or during spinning. Before or after heating, the solids-liquids mixture may be loaded into the second tube 100. In this example, the tube may be filled to approximately ⅗ of capacity; however, any amount of solids-liquids mixture 104 may be used. The second tube 100 may be placed inside the first tube 106, before or after filling, to create a separation device 90. The separation device 90 including the solids-liquids mixture 104 may then be placed into a centrifuge, such as an LW Scientific Ultra 8 Centrifuge. The separation process may be performed without the addition of chemicals. The separation process may be performed at atmospheric pressure and/or without the addition of gasses, and/or pressure and/or vacuum.

An example of the physical principles of operation is shown in FIG. 3. FIG. 3 is an exploded view of the aperture 102 showing a shape of the aperture. The aperture 102, as shown herein, may be funnel shaped. The aperture 102, may have an originating point diameter 210 and a terminating point diameter 212. The originating point diameter 210 may be the diameter of the aperture in closest proximity to the inside of the separation device. The terminating point diameter 212 may be the diameter of the aperture at the point where the liquid 202 escapes. The separation device 90 may be spun in a centrifuge or similar machine that generates a centrifugal force. The optimum range for the spin rate may be 500 rpm to 10,000 rpm. As a result of centrifugal force 204, the liquid 202 may exit the aperture 102 and may collect in the bottom of the first tube FIG. 1, 106, which may be the outer tube. The solid particles 206 may remain in the second tube FIG. 1, 100, which may be the inner tube. The solid particles 206 may be retained in the second tube 100 rather than escaping through the aperture 102 because, for example, the centrifugal force 204 causes them to jam up in the funnel shaped aperture 102, leaving gaps 208 through which the liquid 202 may move toward the terminating point of the aperture 102 and escape. The optimum time range for spinning may be 15 seconds to 20 minutes.

The aperture 102 size that is optimum for extracting oil from Athabasca oil sands may be, for example, approximately 0.40-1.50 mm, 0.45-1.35 mm, 0.80-1.30 mm, or preferably approximately 0.85-1.10 mm. In the case of, for example, Athabasca oil sands, an aperture 102 larger than approximately 1.5 mm would let the solid particles 206 escape (e.g., absent the presence of supplementary retaining devices such as a screen). However, as recognized by those of skill in the art, the size of the aperture may be optimized to find an appropriate range for different combinations of solids and liquids, including oil sands from other regions, oil shale and including Athabasca oil sands that have different particle sizes.

The following example illustrates performance of the process in one system and also includes exemplary results. This example is merely illustrative of the effect on oil recovery from oil sands of different centrifuge speeds and temperatures. The example also illustrates oil extraction from oil sands without the addition of chemicals.

Athabasca oil sand was purchased from the Alberta Research Council. Materials accompanying the oil sand samples provided an estimated composition of 6-12 weight % bitumen, 5-20 weight % water and the balance sand. The bitumen content was not expressed with certainty, therefore a conservative estimate of 12% bitumen was used to calculate percent oil extracted, unless otherwise noted.

The oil sands were loaded into a separation device 90. The separation device 90 was placed into a boiling water bath at approximately 94° C. for approximately 5 minutes or such time as it takes for the temperature of the sand to reach approximately 94° C.

At a spin rate of 3300 rpm and at an initial temperature of 94° C., about 90% of the extractable liquid 202 in FIG. 3 was recovered in 10 minutes (under the conservative assumption the oil sands contained 12 weight % bitumen). The configuration of the centrifuge used in this experiment caused the oil sands sample to experience a g-force of about 900 g's. At lower temperatures, down to 52° C., longer times were needed to remove smaller portions of liquid 202 (~64% at ~72° C. and ~35% at ~52° C., respectively) even at maximum rotation speeds (~3300 rpm). (All calculations assume that the oil sands contained 12 weight % bitumen.) See FIG. 5. The separation process was performed without the addition of chemicals. The separation process was performed at atmospheric pressure, in aerobic conditions.

The following examples illustrate the effect on recovery of various process variables.

EXAMPLE 1

Effect of Spinning Time

The following example is included to illustrate the effect of spinning time on recovery in one system. This example is merely illustrative.

In this example, the effect of spinning time was investigated. The example was performed in duplicate. For this exemplary experiment two separation devices 90 were weighed. Each separation device 90 consisted of a first tube 106 and a second tube 100. The second tube 100 was nested inside of the first tube 106 to form a separation device 90. The second tube 100 included an aperture 102.

Prior to spinning, the first tube 106 and the second tube 100 of each separation device 90 were weighed. Each separation device 90 was loaded with an approximately equal amount of solids-liquids mixture 104, which in this example was oil sand. The separation devices 90 were loaded by inserting the solids-liquids mixture 104, in this case oil sand, into the second tube 100 to a level of approximately ⅗ full. The second tube 100 was then nested into the first tube 106 and the resulting separation device 90 was reweighed to determine sample size (i.e., the difference between the weight of the unloaded assembled separation device versus the weight of the loaded and assembled separation device 90). The weight of the bitumen present in each sample of oil sand was approximated by assuming that the samples contained 12 weight % bitumen.

Each loaded separation device 90 was then placed in a constant temperature bath at 94° C. until the temperature in each stabilized at 94° C. After heating, each loaded separation device 90 was then placed in the centrifuge and spun for approximately 1 minute at about 3300 rpm.

After spinning, each loaded separation device 90 was removed from the centrifuge. Each separation device 90 was disassembled by removing the second tube 100 from the first tube 106. The first tube 106 of each device was weighed to determine the amount of liquid 202, in this case oil, was deposited into the first tube 106 (as demonstrated by increased weight) by the spinning. The second tube 100 of each device was weighed to determine the amount of liquid 202 removed from the solids-liquids mixture 104 (as demonstrated by decreased weight) by the spinning.

After weighing, each separation device 90 was reassembled by inserting the second tube 100 into the first tube 106. Each loaded separation device 90 was then placed in a constant temperature bath at 94° C. until the temperature in each stabilized at 94° C. After heating, each loaded separation device 90 was then placed in the centrifuge and spun for approximately 1 minute at about 3300 rpm. After spinning for 1 minute, each separation device 90 was again separated by removing the second tube 100 from the first tube 106. The first tube 106 and second tube 100 were weighed to determine the degree of separation after 2 minutes. This process was repeated for 3 more cycles. The degree of separation at 1, 2, 3, and 4 minutes is illustrated in the following tables and plotted into FIG. 4. Where the X-axis displays the total spin time and the Y-axis shows percent of the oil Raw Data Summary

| tubes 2&3 | inner tube sample 1 (g) | outer tube sample 1 (g) | inner tube sample 2 (g) | outer tube sample 2 (g) | sample 1 outer tube mass gain (g) | sample 2 outer tube mass gain (g) | tube 1 % mass gain* | tube 2 % mass gain* |
|---|---|---|---|---|---|---|---|---|
| initial, empty | 10.493 | 15.649 | 10.632 | 15.492 | | | | |
| w/oil sand | 13.107 | | 13.526 | | | | | |
| oil sand | | 2.614 | | 2.896 | | | | |
| spin 1 min | 12.958 | 15.791 | 13.35 | 15.661 | 0.142 | 0.169 | 45.3 | 48.6 |
| spin 2 min | 12.911 | 15.835 | 13.331 | 15.678 | 0.186 | 0.186 | 59.3 | 53.5 |

-continued

| tubes 2&3 | inner tube sample 1 (g) | outer tube sample 1 (g) | inner tube sample 2 (g) | outer tube sample 2 (g) | sample 1 outer tube mass gain (g) | sample 2 outer tube mass gain (g) | tube 1 % mass gain* | tube 2 % mass gain* |
|---|---|---|---|---|---|---|---|---|
| spin 3 min | 12.901 | 15.85 | 13.32 | 15.688 | 0.201 | 0.196 | 64.1 | 56.4 |
| spin 4 min | 12.889 | 15.853 | 13.313 | 15.693 | 0.204 | 0.201 | 65.0 | 57.8 |
| hole size (mm) | Sample 1 | 0.79 | Sample 2 | 0.93 | | | | |

*percent gains based on oil fraction of 12% weight percent

Sample 1 Summary, Aperture Size 0.79 Mm

| | Oil Sand (g) | Oil (g) | % Extracted |
|---|---|---|---|
| Start | 2.614 | 0.314 | |
| 1 min | (0.149) | 0.146 | 46% |
| | (0.142) | | |
| 2 min | (0.196) | 0.191 | 61% |
| | (0.186) | | |
| 3 min | (0.206) | 0.204 | 65% |
| | (0.201) | | |
| 4 min | (0.218) | 0.211 | 67% |
| | (0.204) | | |

Sample 2 Summary, Aperture Size 0.93 Mm

| | Oil Sand (g) | Oil (g) | % Extracted |
|---|---|---|---|
| Start | 2.896 | 0.348 | |
| 1 min | (0.176) | 0.173 | 50% |
| | (0.169) | | |
| 2 min | (0.195) | 0.191 | 55% |
| | (0.186) | | |
| 3 min | (0.206) | 0.201 | 58% |
| | (0.196) | | |
| 4 min | (0.213) | 0.207 | 59% |
| | (0.201) | | |

All data is calculated based on an assumed, conservative value of 12 weight % oil per oil sand sample. Actual percent extraction is likely higher.

The combination of heating, spinning and an appropriate aperture size is highly effective at separating oil from oil sands, even in the absence of chemical extraction agents.

Figure 4:
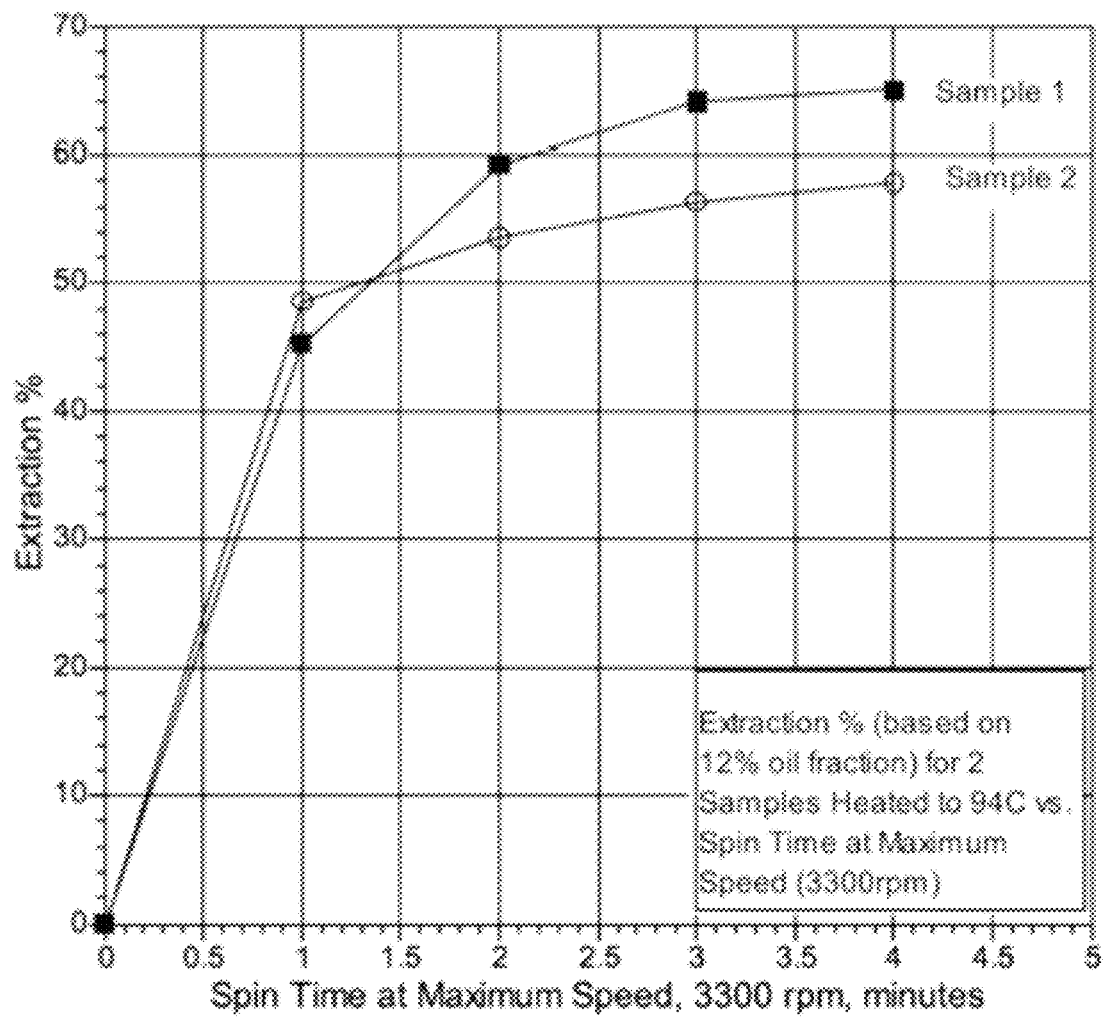
FIG. 4 is a diagram illustrating the effect of spinning time.

As illustrated in FIG. 4, when the liquid is oil and the solid-liquid mixture is oil sands, the oil is removed rather quickly and in a large proportion to the amount available at 94° C. and 3300 rpm. These results are expected to vary, depending upon the nature of the device used and the starting materials.

EXAMPLE 2

Effect of Temperature

The following example is included to illustrate the effect of temperature on recovery. This example is merely illustrative.

In this example, the effect of temperature on recovery was investigated. The example was performed at three exemplary temperatures, 94° C., 72° C., and 52° C. For this exemplary experiment three separation devices 90 were prepared, each of which consisted of a first tube 106 and a second tube 100. The second tube 100 was nested inside of the first tube 106 to form a separation device 90. The second tube 100 included an aperture 102 as described above. Each separation device 90 was weighed prior to loading. The weight amount of the bitumen present in each sample of oil sand was approximated by assuming that the samples contained 12 weight % bitumen.

After weighing, each separation device 90 was loaded with an approximately equal amount of solids-liquids mixture 104, which in this example was oil sand. The separation devices 90 were loaded by inserting the solids-liquids mixture 104, in this case oil sand, into the second tube 100 to a level of approximately ⅗ full. The second tube 100 was then nested into the first tube 106 and the resulting separation device 90 was reweighed to determine sample size.

Each loaded separation device 90 was then placed in a constant temperature bath. In this example, each of the three separation devices 90 was warmed to a different temperature. One separation device 90, represented in FIG. 5 as a triangle, was warmed in a constant temperature bath at approximately 94° C. until the temperature in the separation device 90 stabilized at approximately 94° C. A second separation device 90, represented in FIG. 5 as a circle, was warmed in a constant temperature bath at approximately 72° C. until the temperature in the separation device 90 stabilized at approximately 72° C. A third separation device 90, represented in FIG. 5 as a square, was warmed in a constant temperature bath at approximately 52° C. until the temperature in the separation device 90 stabilized at approximately 52° C.

After heating, each loaded separation device 90 was then placed in the centrifuge and spun for approximately 1 minute at about 3300 rpm. After spinning for one minute, each loaded separation device 90 was removed from the centrifuge. The separation device 90 was disassembled by removing the second tube 100 from the first tube 106. The first tube 106 of each separation device 90 was weighed to determine the amount of liquid 202, in this case oil, deposited into the first tube 106 (as demonstrated by increased weight) by the spinning. The second tube 100 of each separation device 90 was weighed to determine the amount of liquid 202 removed from the solids-liquids mixture 104 (as demonstrated by decreased weight) by the spinning.

After weighing, each separation device 90 was reassembled by inserting the second tube 100 into the first tube 106. Each loaded separation device 90, represented by a triangle, circle, and square, was then placed back into a constant temperature bath at approximately 94° C., 72° C., or 52° C., respectively until the temperature in each stabilized at approximately 94° C., 72° C., or 52° C., respectively. After heating, each loaded separation device 90 was then placed in the centrifuge and spun for approximately 5 minutes at about 3300 rpm. After spinning for approximately 5 minutes, each separation device 90 was again separated by removing the second tube 100 from the first tube 106. The first tube 106 and second tube 100 were weighed to determine the degree of separation after 5 minutes.

After weighing, each separation device 90 was reassembled by inserting the second tube 100 into the first tube 106. Each loaded separation device 90, represented by a triangle, circle, and square, was then placed back into a constant temperature bath at approximately 94° C., 72° C., or 52° C., respectively until the temperature in each stabilized at approximately 94° C., 72° C., or 52° C., respectively. After heating, each loaded separation device 90 was then placed in the centrifuge and spun for approximately 10 minutes at about 3300 rpm. After spinning for 10 minutes, each separation device 90 was again separated by removing the second tube 100 from the first tube 106. The first tube 106 and second tube 100 were weighed to determine the degree of separation after 10 minutes.

Figure 5:
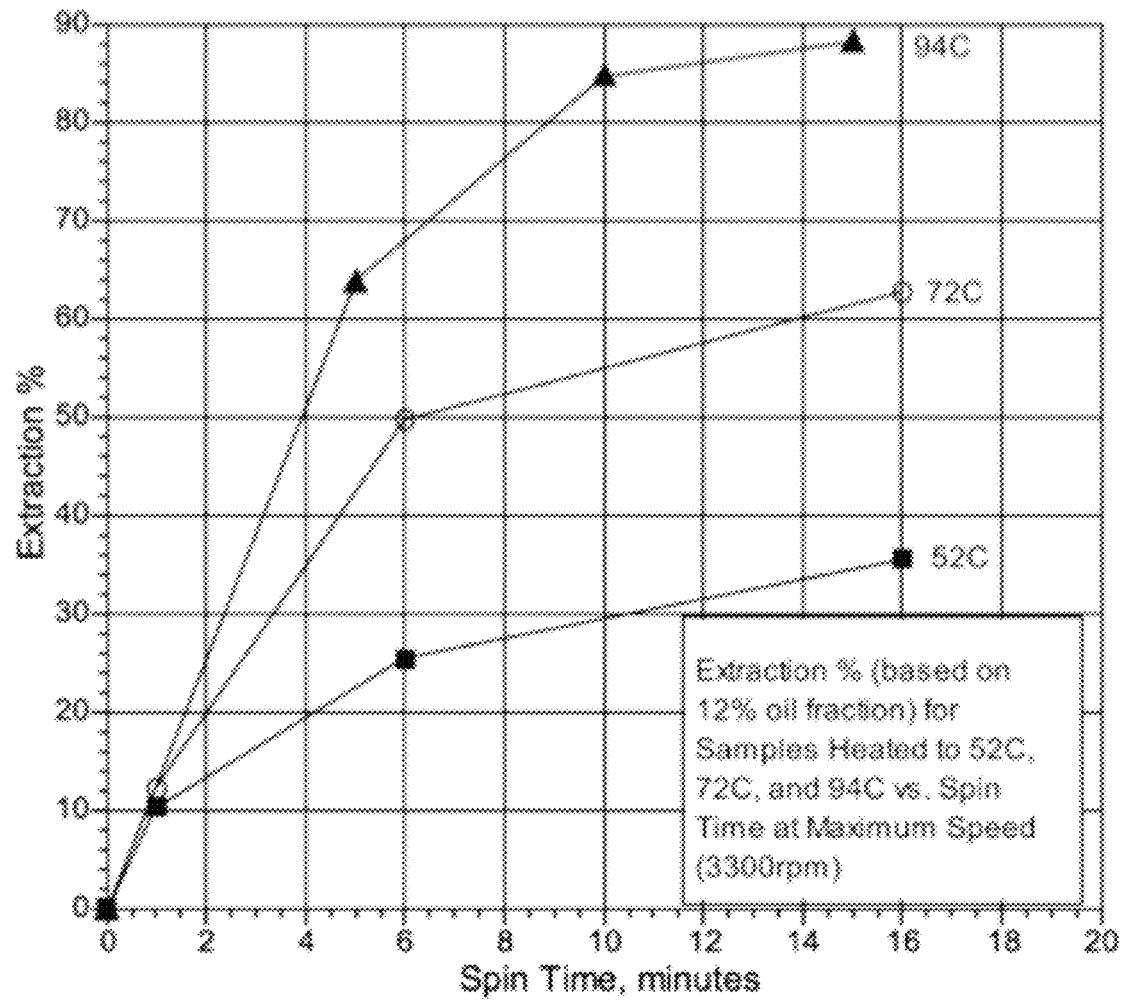
FIG. 5 is a diagram illustrating the effect of temperature.

The degree of separation for each separation device 90 at three temperatures 94° C., 72° C., or 52° C. was plotted in FIG. 5. The degree of separation at each temperature and at each of 1, 5, and 16 minutes is plotted.

As illustrated in FIG. 5, even in the absence of chemical agents, the extraction percentage of oil from oil sands on laboratory scale at approximately 94° C. and approximately 3300 rpm levels off at about 10 minutes spinning time. These results are expected to vary depending upon the nature of the device and the starting materials.

EXAMPLE 3

Effect of Spin Rate on Recovery

The following example is included to illustrate the effect of spin rate on recovery in a laboratory scale system. This example is merely illustrative and not meant to be limiting.

In this example, the effect of spin rate on recovery was investigated. The example was performed at two exemplary spin rates, 3300 rpm and 2000 rpm. All other variables were identical between the two samples. For this exemplary experiment two separation devices 90 were prepared, each of which consisted of a first tube 106 and a second tube 100. The second tube 100 was nested inside of the first tube 106 to form a separation device 90. The second tube 100 included an aperture 102. Each separation device 90 was weighed prior to loading.

After weighing, each separation device 90 was loaded with an approximately equal amount of solids-liquids mixture 104, which in this example was oil sand. The separation devices 90 were loaded by inserting the solids-liquids mixture 104, in this case oil sand, into the second tube 100 to a level of approximately ⅗ full. The second tube 100 was then nested into the first tube 106 and the resulting separation device 90 was reweighed to determine sample size.

Each loaded separation device 90 was then placed in a constant temperature bath. In this example, each separation device 90, was warmed in a constant temperature bath at 94° C. until the temperature in the separation device 90 stabilized at 94° C.

After heating, each loaded separation device 90 was then placed in the centrifuge and spun for approximately 1 minute. One separation device 90 represented in FIG. 6 by the letter B, was spun at about 3300 rpm. A second separation device 90 represented in FIG. 6 by the letter E, was spun at about 2000 rpm. After spinning each separation device 90 at its respective speeds for one minute, each loaded separation device 90 was removed from the centrifuge. Each separation device 90 was disassembled by removing the second tube 100 from the first tube 106. The first tube 106 of each device was weighed to determine the amount of liquid 202, in this case oil, deposited into the first tube 106 (as demonstrated by increased weight) by the spinning. The second tube 100 of each device was weighed to determine the amount of liquid 202 removed from the solids-liquids mixture 104 (as demonstrated by decreased weight) by the spinning. The weight amount of the bitumen present in each sample of oil sand was approximated by assuming that the samples contained 12 weight % bitumen.

After weighing, each separation device 90 was reassembled by inserting the second tube 100 into the first tube 106. Each loaded separation device 90, represented by a B or an E, was then placed back into a constant temperature bath at approximately 94° C. until the temperature in each stabilized at approximately 94° C. After heating, each loaded separation device 90, represented by a B or an E, was then placed in the centrifuge and spun for approximately 1 minute at about 3300 rpm and 2000 rpm, respectively. After spinning for 1 minute, each separation device 90 was again separated by removing the second tube 100 from the first tube 106. The first tube 106 and second tube 100 were weighed to determine the degree of separation after 1 minute at about 3300 rpm and 2000 rpm, respectively.

Figure 6:
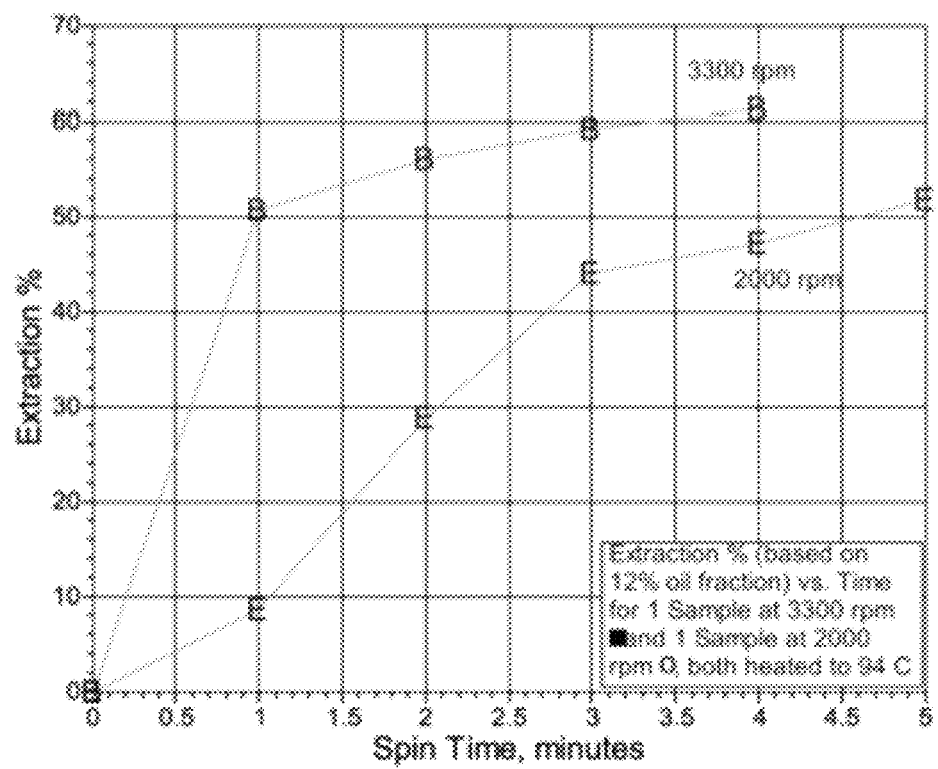
FIG. 6 is a diagram illustrating the effect of the spin rate.
Figure 7:
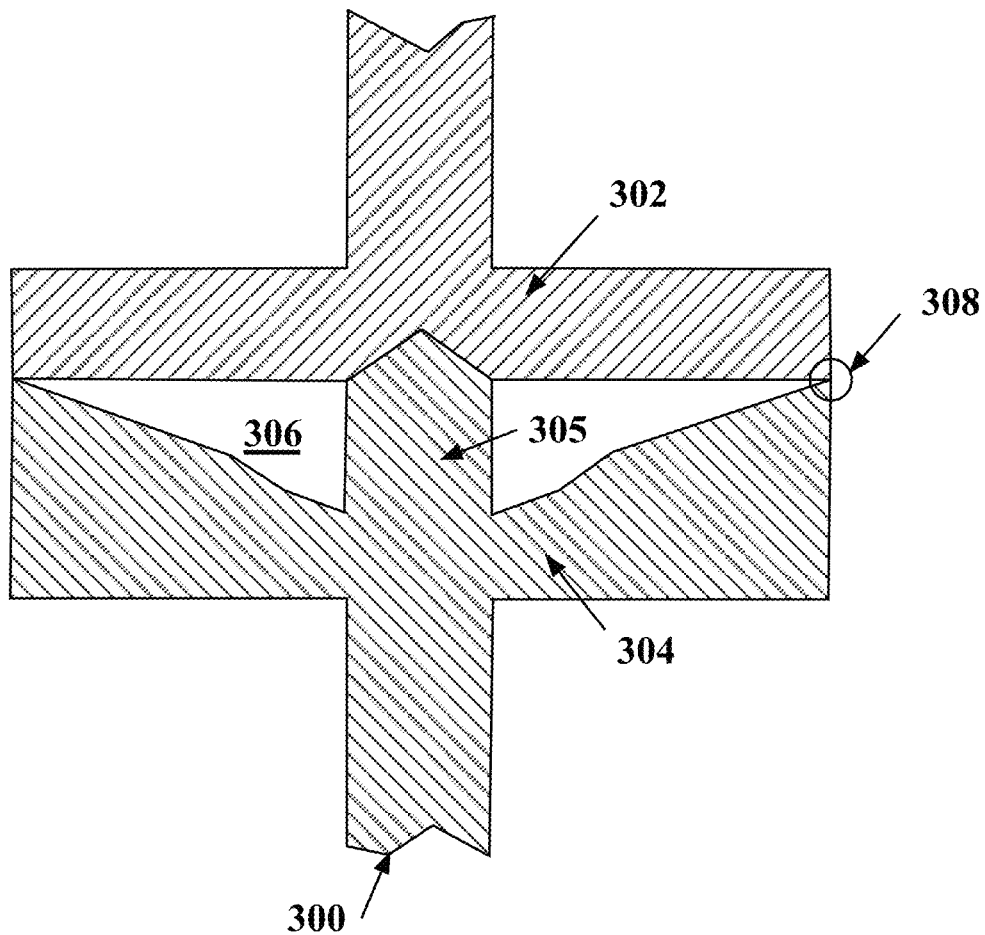
FIG. 7 is a cross-sectional view of a second system.

After weighing, each separation device 90 was reassembled by inserting the second tube 100 into the first tube 106. The cycle of heating, spinning, and weighing was repeated and results were plotted on FIG. 6 for each separation device 90 at 1, 2, 3, 4, and 5 minutes. FIG. 6 illustrates that percent extraction begins to converge at longer spin times.

| Samples B & E | inner tube Sample B (g) | outer tube Sample B (g) | inner tube Sample E (g) | outer tube Sample E (g) | Sample B mass gain (g) | Sample E mass gain (g) | Sample B % gain* | Sample E % gain* |
|---|---|---|---|---|---|---|---|---|
| initial, empty | 10.542 | 15.384 | 10.389 | 15.253 | | | | |
| w/oil sand | 13.576 | | 13.435 | | | | | |
| oil sand | | 3.034 | | 3.046 | | | | |
| spin 1 min | 13.512 | 15.452 | 13.405 | 15.277 | 0.068 | 0.024 | 21.7 | 6.9 |
| spin 2 min | 13.429 | 15.533 | 13.335 | 15.35 | 0.149 | 0.097 | 47.5 | 27.9 |
| spin 3 min | 13.382 | 15.577 | 13.282 | 15.398 | 0.193 | 0.145 | 61.5 | 41.7 |
| spin 4 min | 13.348 | 15.609 | 13.271 | 15.408 | 0.225 | 0.155 | 71.7 | 44.6 |

-continued

| Samples B & E | inner tube Sample B (g) | outer tube Sample B (g) | inner tube Sample E (g) | outer tube Sample E (g) | Sample B mass gain (g) | Sample E mass gain (g) | Sample B % gain* | Sample E % gain* |
|---|---|---|---|---|---|---|---|---|
| spin 5 min | 13.338 | 15.621 | 13.255 | 15.421 | 0.237 | 0.168 | 75.6 | 48.3 |
| hole size (mm) | tube 5 | 0.9906 | tube 6 | 0.889 | | | | |

*percent gains based on oil fraction of 12%

Summary Sample B
Hole size 0.99 mm

| | Oil Sand (g) | Oil (g) | % Extracted |
|---|---|---|---|
| Start | 3.034 | 0.36 | |
| 1 min | (0.064) | 0.066 | 18% |
| | (0.068) | | |
| 2 min | (0.147) | 0.148 | 41% |
| | (0.149) | | |
| 3 min | (0.194) | 0.194 | 54% |
| | (0.193) | | |
| 4 min | (0.228) | 0.227 | 63% |
| | (0.225) | | |
| 5 min | (0.238) | 0.238 | 66% |
| | (0.237) | | |

Summary Sample E
Hole size 0.89 mm

| | Oil Sand (g) | Oil (g) | % Extracted |
|---|---|---|---|
| Start | 3.046 | 0.37 | |
| 1 min | (0.030) | 0.027 | 7% |
| | (0.024) | | |
| 2 min | (0.100) | 0.099 | 27% |
| | (0.097) | | |
| 3 min | (0.153) | 0.149 | 40% |
| | (0.145) | | |
| 4 min | (0.164) | 0.160 | 43% |
| | (0.155) | | |
| 5 min | (0.180) | 0.174 | 47% |
| | (0.168) | | |

For another example, the following calculations may be helpful in the evaluation and description of the spin rate.

$$a_c = rw^2 \quad (1)$$

$$g_c = \frac{a_c}{g_o} \quad (2)$$

$$g_c = \frac{rw^2}{g_o} \quad (3)$$

$a_c$=centripetal acceleration (m/s$^2$)
r=radius (m)
w=angular velocity (rpm)
$g_o$=gravitational acceleration at Earth's surface (9.8 m/s$^2$)
$g_c$=G force (g)

FIGS. 7-13 illustrate a second system 300 of a separation device. The second system may have a clam shell-like formation which may further have a first portion 302 and a second portion 304. The first portion 302 and the second portion 304, depending on the orientation of the device, may be the top and the bottom of the separation device of the second system 300. In FIG. 4, the first portion 302 and the second portion 304 of the second system fit together with the aid of, for example, an aligning pivot 305. The second portion 304 may have cavities 306, wherein each cavity 306 may form an aperture 308 where the first portion 302 and second portion 304 of the second system come together.

Figure 8:
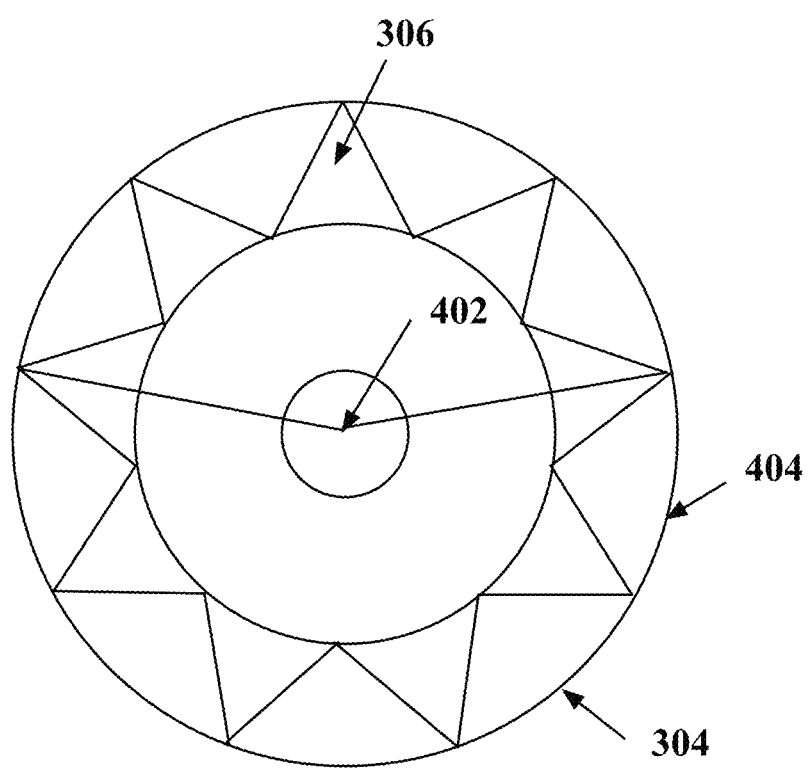
FIG. 8 is a top view of the bottom portion of the second system.
Figure 9:
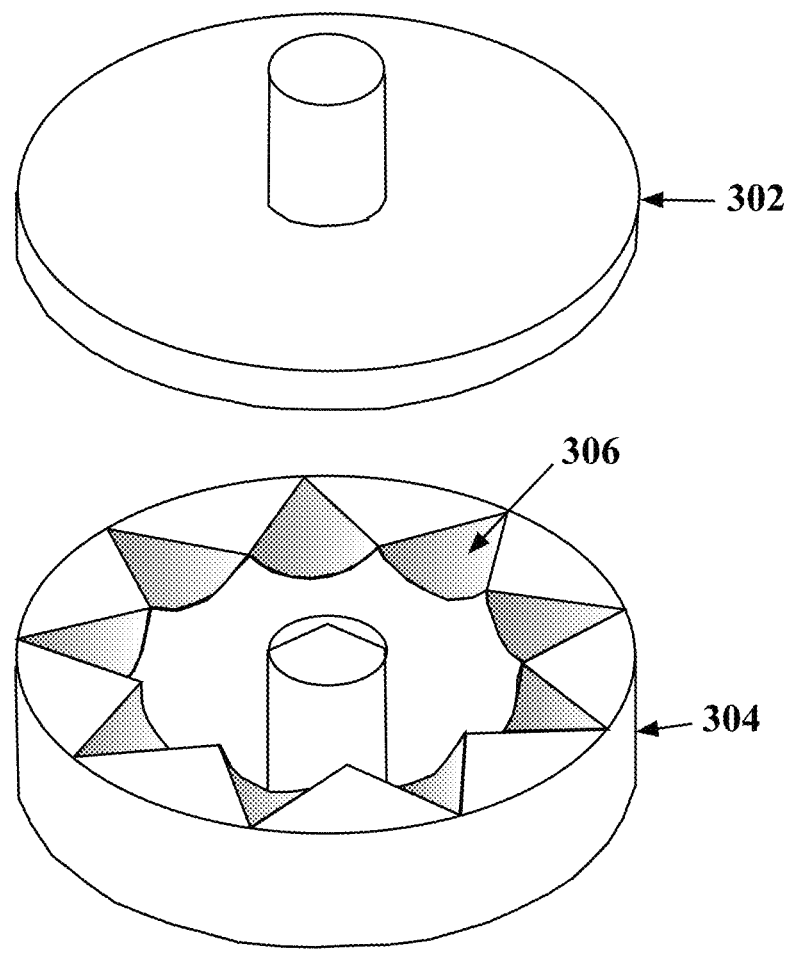
FIG. 9 is a perspective view of the top and bottom portions of the second system.

FIG. 8 illustrates how the cavities 306 may align radially. For example, the cavities 306 may be roughly semi conical with an opening that is wider toward the center 402 of the second portion 304 of the second system 300 and narrows as it reaches the perimeter 404. While the cavities 306 are illustrated as semi conical in FIG. 9, other shapes may be used.

Figure 11:
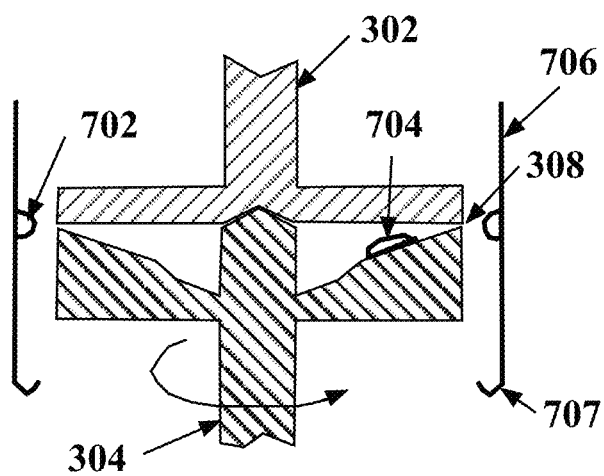
FIG. 11 is a cross-sectional view of the second system in a closed conformation and surrounded by a liquid collector.

The second system 300 may also include a liquid collector 706, as shown in FIG. 11, which may be cylindrical, or any other shape. For example, the liquid collector may or may not approximate the shape of the second system separation device 300. The liquid collector 706 may include a gutter 707 which may collect and funnel the liquid to a collection reservoir. The gutter 707 may be located on the lower edge of the liquid collector, or may be located in any other location. The liquid collector 706 may be arranged with the second system separation device 300 such that the second system separation device 300 may be raised and lowered into position with the liquid collector 706 as the separation process proceeds.

Figure 10:
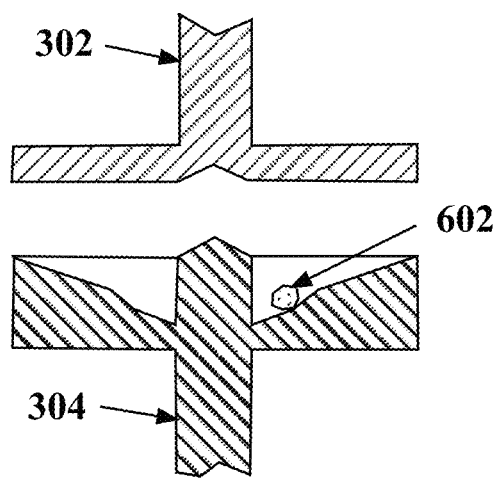
FIG. 10 is a cross-sectional view of the second system in an open conformation.

FIGS. 10-13 illustrate how the process for extracting liquids from solid particles might be adapted for the second system 300 separation device described above. The solids-liquids mixture 602 may be placed inside the cavities 306 in the second system 300. In FIG. 10 the solids-liquids mixture 602 may be heated before loading, during loading, or after loading into the separation device of the second system 300. The second system 300 may be lowered into a liquid collector 706 and may be spun as shown in FIG. 11. Spinning may cause the liquid 702 to separate from the solid particles 704. The liquid 702 may exit apertures 308, and may accumulate, for example, on the liquid collector 706, and/or in a gutter 707. The solid particles 704 may remain inside the closed second system 300. The apertures 308 may be funnel shaped, with the diameter of the aperture decreasing as it reaches the termination point of the aperture where the liquid escapes.

Figure 12:
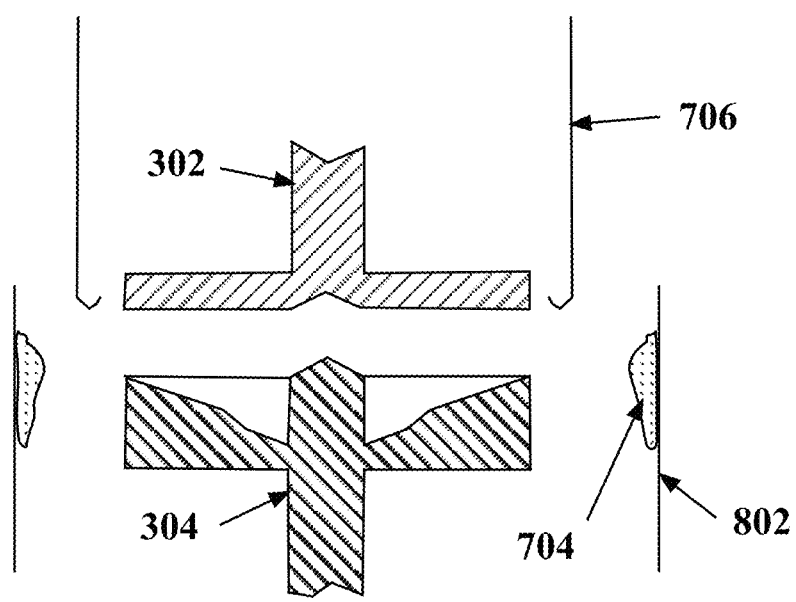
FIG. 12 is a cross-sectional view of the second system in an open conformation and surrounded by a cylindrical particle collector.

After separation has been accomplished, the liquid collector 706 may be raised, and the second system 300 may be opened as shown in FIG. 12. The first portion 302 and second portion 304 may be spun such that the solid particles are spun out of the cavities 306. A solid particles collector 802 may be used to catch the solid particles 704.

Figure 13:
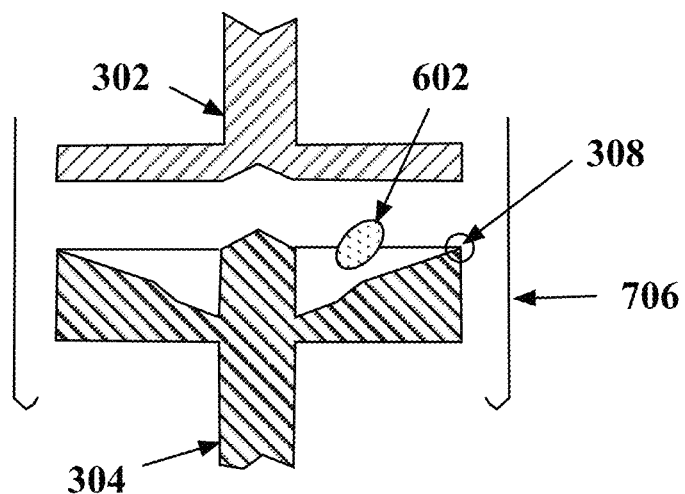
FIG. 13 is a cross-sectional view of the second system in open conformation with a solids-liquids mixture inside.

The second system 300 may then be reused. A new load of heated or unheated solids-liquids mixture 602 may be inserted into the second system 300 and the liquid collector 706 may replaced into a position that will allow it to capture extracted liquids. The second system 300 may be closed and respun, as shown in FIG. 13, continuing the cycle. Alternatively, the cycle may terminate after one use. The optimal aperture 308 size for removing oil from Athabsca oil sands is approximately 0.40-1.50 mm, 0.45-1.35 mm, 0.80-1.30 mm, and/or 9.90-1.20 mm. However, other sizes may be used.

Figures 14, 14A:
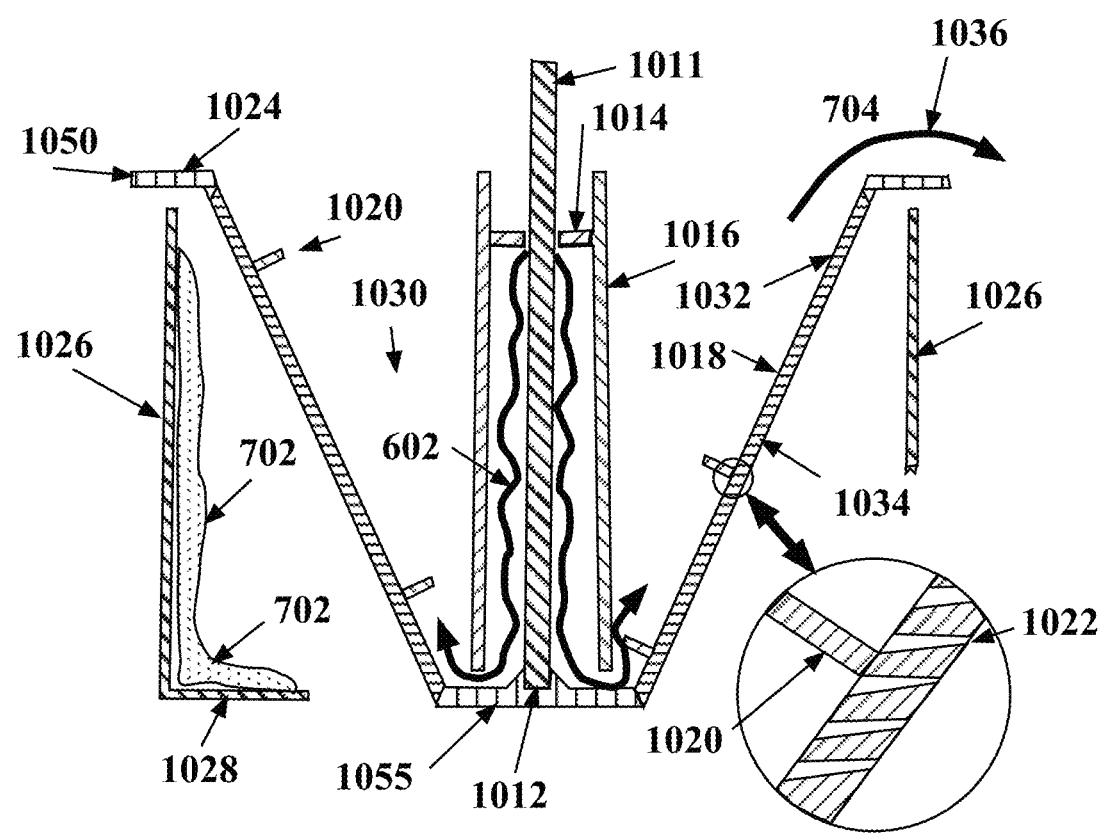
FIG. 14 is a cross-sectional view of a third system.

FIG. 14 is a cross-sectional view of a third system 1010, the confining portion 1030 of which may have a cyclone formation. The third system 1010 may include a confining portion 1030 and a collecting portion 1026. The third system 1010 may also include a coaxial piston 1014 and a central shaft 1011 which may be supported by a bearing 1012. The third system 1010 may also include a feed tube 1016. The confining portion 1030 may be assembled inside of the collecting portion 1026, for example, in a nested conformation. The feed tube 1016 may be assembled inside of the confining portion 1030. In one example, the feed tube 1016 may be assembled with the central shaft 1011.

The confining portion 1030 may be approximately conical in shape. The confining portion 1030 may have a top 1050 and a bottom 1055. The top 1050 of the confining portion 1030 may be dimensioned larger than the bottom 1055 of the confining portion.

The confining portion 1030 may have walls 1018. The walls 1018 may have an interior face 1032 and an exterior face 1034. The interior face 1032 of the walls 1018 of the confining portion 1030 may have baffles 1020 located thereon. The baffles 1020 may be continuous with the interior face 1032. The baffles 1020 may be arranged in a screw-thread-like fashion along the interior face 1032 of the walls 1018 of the confining portion 1030 of the third system 1010. FIG. 14 shows a cross section view of the third system 1010. Here, the baffles 1020 are shown in cross section protruding from the interior face 1032 of the walls 1018 of the confining portion 1030. FIG. 14a is an exploded view further showing the baffles 1020 protruding from the interior face 1032 of the walls 1018 of the confining portion 1030. The baffles 1020 may be continuous. The baffles 1020 may be arranged radially.

Figure 15:
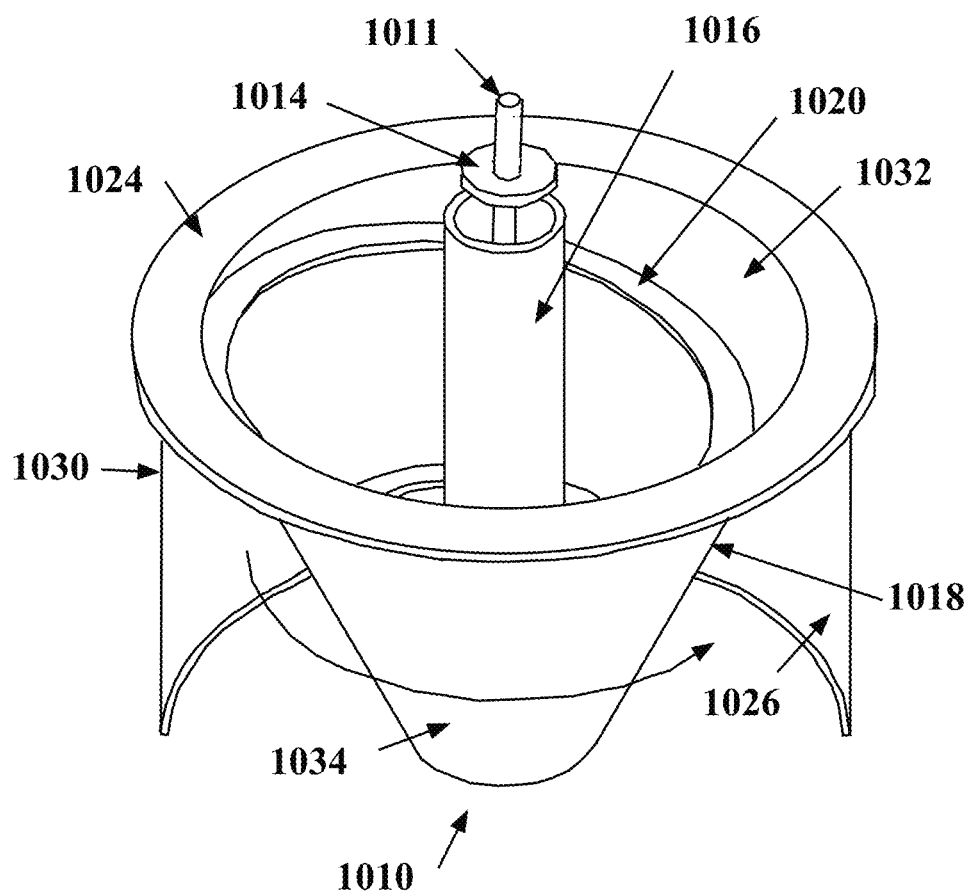
FIG. 15 is a perspective view of the third system.

FIG. 15 shows a perspective view of the third system 1010. Here, the baffles 1020 are shown protruding from the interior face 1032 of the confining portion 1030. The collecting portion 1026 is shown in cut-away. FIG. 15 provides an illustration of the screw-thread-like fashion with which the baffles 1020 are assembled with the interior face 1032 of the confining portion 1030.

The walls 1018 of the third system 1010 may further include small apertures FIG. 3, 102 or apertures 1022. An exploded exemplary view of a wall 1018 including apertures 1022 is illustrated in FIG. 14a. Alternatively or additionally, the apertures FIG. 3, 102 may be funnel shaped as shown in FIG. 3.

The collecting portion 1026 of the third system 1010 may be cylindrical or any other shape.

FIGS. 14-15 illustrate how the process for extracting liquids from solid particles might be adapted for the third system 1010 described above. The solids-liquids mixture 602, for example, oil sands, may be heated prior to loading or may be heated during loading or, alternatively, in the third system 1010. For example, the solids-liquids mixture 602 may be heated in the feed tube 1016, in the confining portion 1030 (which may be cyclone in shape), or in a retaining tank attached to the feed tube, and etc.; alternatively, it may be heated prior to being loaded into the feed tube 1016.

The heated or unheated solids-liquids mixture 602 may be loaded into the third system 1010 by a feed tube 1016. The feed tube 1016 may be centrally located. A coaxial piston 1014 may push an amount of a heated solids-liquids mixture 602 down a feed tube 1016 and out the bottom of the feed tube 1016 into the confining portion. A centrifugal force may be applied to the confining portion 1030. The confining portion 1030 may be rotated co-axially as shown in FIG. 15. The heated solids-liquids mixture 602 may be centrifugally forced outward and upward along the baffles 1020 on the interior face 1032 of the wall 1018 of the confining portion 1030.

The liquid 702 may escape through the small apertures 1022, which may have a diameter of approximately 0.40-1.50 mm, 0.45-1.35 mm, 0.80-1.30 mm or more preferably 0-0.90-1.20 mm. The apertures 1022 may be dimensioned as shown in FIG. 3. Solid particles 704 may be centrifugally pushed upward and eventually go over the top of the third system 1010 (as demonstrated by FIG. 14 arrow 1036) where it may be collected and recycled, disposed of or otherwise. The liquid 702 that is extracted may be collected by the collecting portion 1026, for example, by accumulating at the bottom 1028. This may be a continuous process by which the feed tube 1016 continually feeds solids-liquids mixture 602 into the third system 1010 to replace the liquid and solids that are removed.

Figure 16:
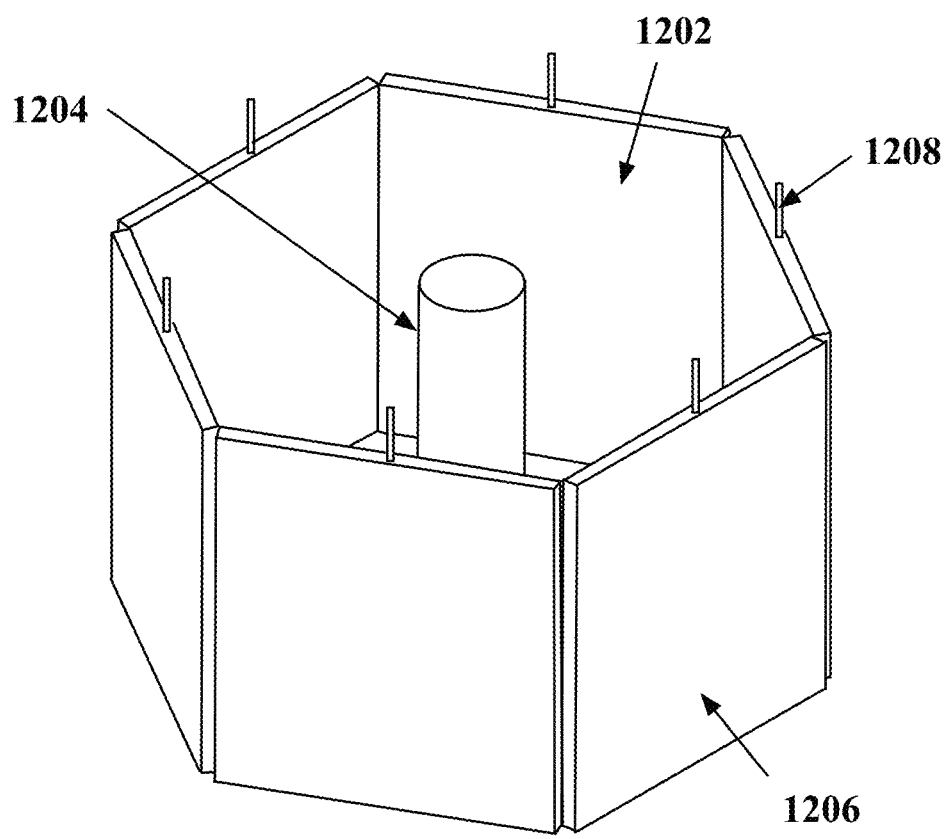
FIG. 16 is a perspective view of the fourth system.
Figure 17:
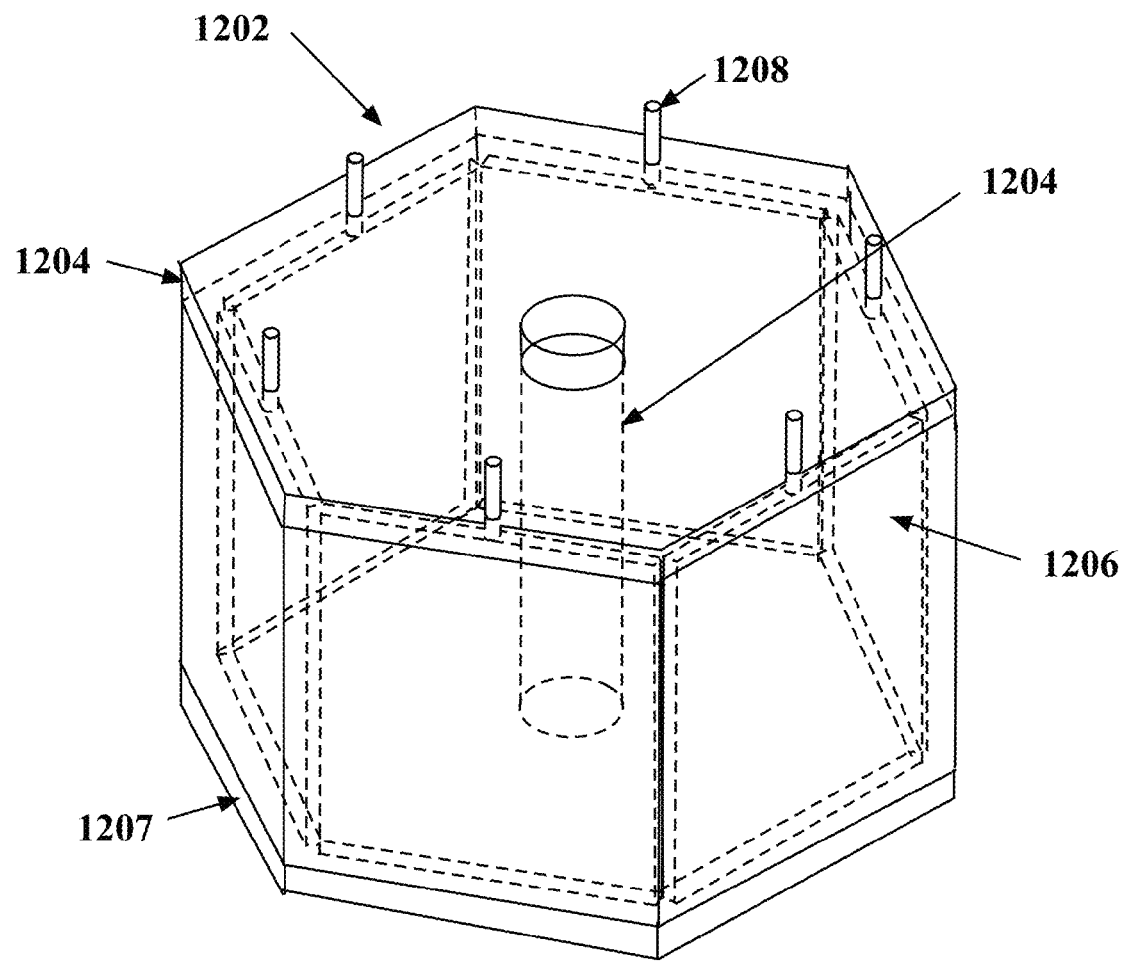
FIG. 17 is a perspective view of the fourth system with a top and a bottom.
Figure 18:
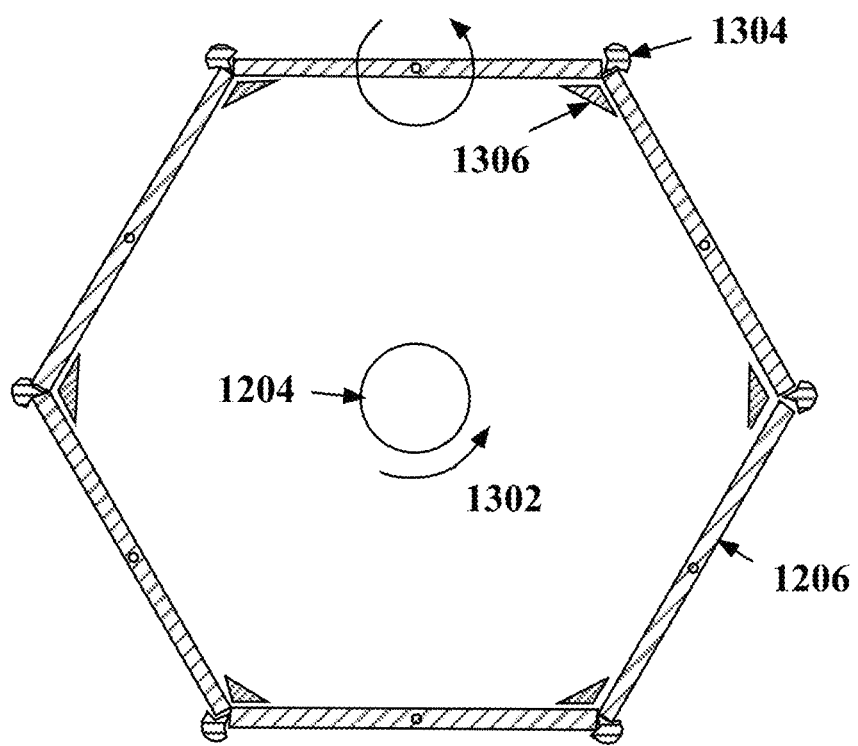
FIG. 18 is a top view of the fourth system.
Figure 19:
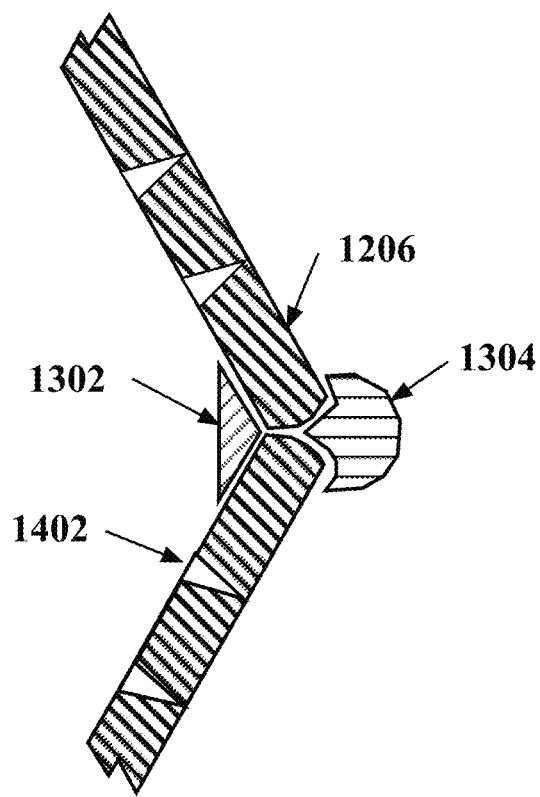
FIG. 19 is an exploded detail of the fourth system.

FIG. 16 shows a fourth system which may be formed of rotating planes. The fourth system may have a chamber 1202. This device may be self-cleaning. As shown in FIG. 17, the rotating planes system may have a top plate 1205 and a bottom plate 1207, which may be coaxially mounted with a main shaft 1204 so that the top plate 1205 can be raised and the bottom plate 1207 can be lowered. The chamber may be formed of multiple chamber walls 1206. The chamber walls may have aperture 1402 through which liquid may be extracted from the liquids-solid mixture. The chamber 1202 can take many shapes depending on the number of walls 1206, such as a hexagonal shape as shown in FIGS. 16-20. Each of the walls 1206 may be centrally pivoted 1208. The chamber 1202 rotating planes separator may have at least two configurations, for example, a closed configuration (see, e.g., FIGS. 16, 17, 20a, 20c, 20e) and an open configuration (see, e.g., FIGS. 20b, 20d). In the closed configuration, the walls 1206 may be sealed by outer 1304 and inner 1306 splines as shown in FIG. 19. The apertures 1402 in the chamber walls 1206 may have a diameter of approximately 0.40-1.50 mm, 0.45-1.35 mm, 0.80-1.30 mm, or 0.90-1.20 mm. The apertures 1402 may have a diameter that decreases from the originating point on the inner face of the wall to the terminating point on the outside face of the wall, where the oil escapes. (See, e.g., FIG. 3) In the open configuration, the walls 1206 may be rotated on their pivot point such that they are no longer in contact. (See, e.g., FIGS. 20b, 20d)

Figure 20:
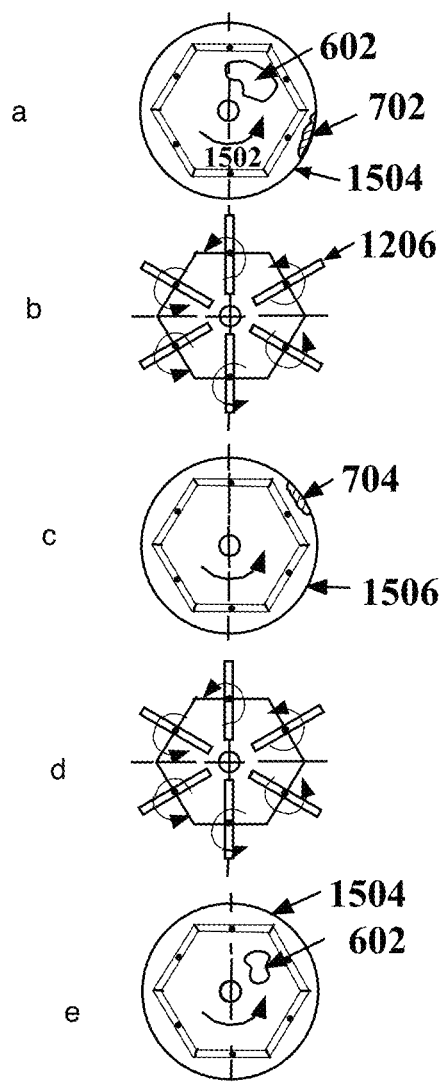
FIG. 20 is an exemplary top view of the spinning and cleaning process of the fourth system.

In operation, heated solids-liquids mixture 602 may be placed in the chamber and the chamber may be spun, as shown in the top view in FIG. 20. The liquid 702 separates from the solid particles 704 and may be collected by a liquid collector 1504 surrounding the chamber. The liquid collector 1504 may be, for example, cylindrical or may otherwise approximate the shape of the chamber 1202. Alternatively, the liquid collector 1504 may be of any other shape or format. When separation has been completed and rotation has stopped, the bottom plate may be lowered. The top plate may be raised and the liquid collector 1504 may be raised even more, so that its bottom is above the top of the chamber walls 1206, which are rotated as shown in the second step in FIG. 20b.

Next, the chamber walls 1206 may be locked by the splines at for example 180° so that the apertures face toward the center of the chamber. The chamber 1202 may be spun to cleanse the remaining solid particles 704. The solid particles 704 removed from the chamber may be caught by a solid-particle collector 1506 as shown in the third step in FIG. 20c.

After cleaning, the chamber 1202 may be stopped; the solid-particle collector 1506 may be lowered away from the chamber 1202. The chamber 1202 may be returned to a closed position by rotating the walls 1206 180° as shown in the fourth step in FIG. 20d. The bottom plate may rise to complete the closed conformation. At that point, more solids-liquids mixture 602 may be placed inside the chamber, and the top may be lowered and the liquid collector 1504 raised into conformation for the next round of processing.

Figure 21:
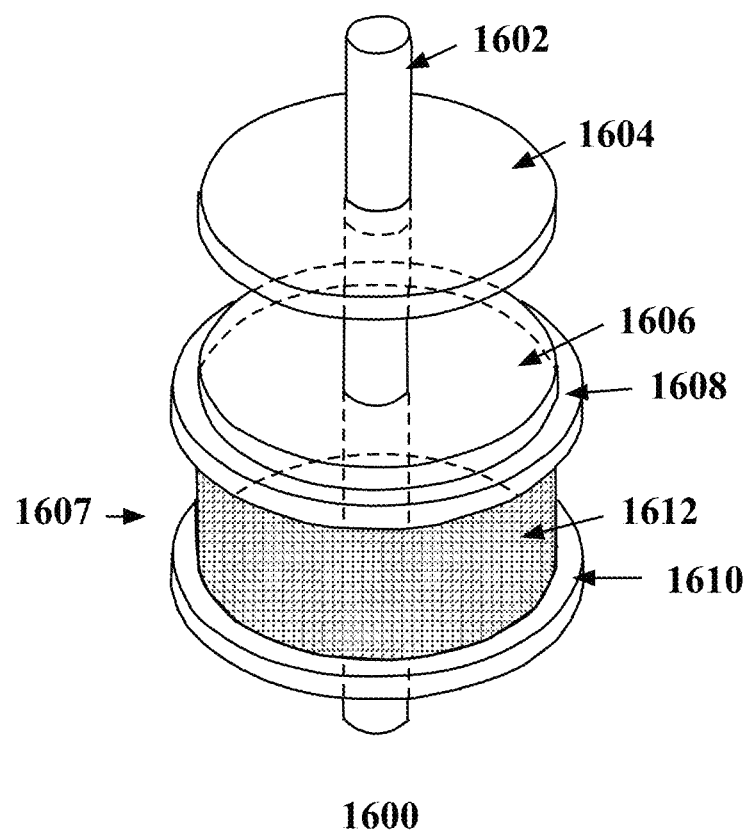
FIG. 21 is a perspective view of a fifth system.
Figure 22:
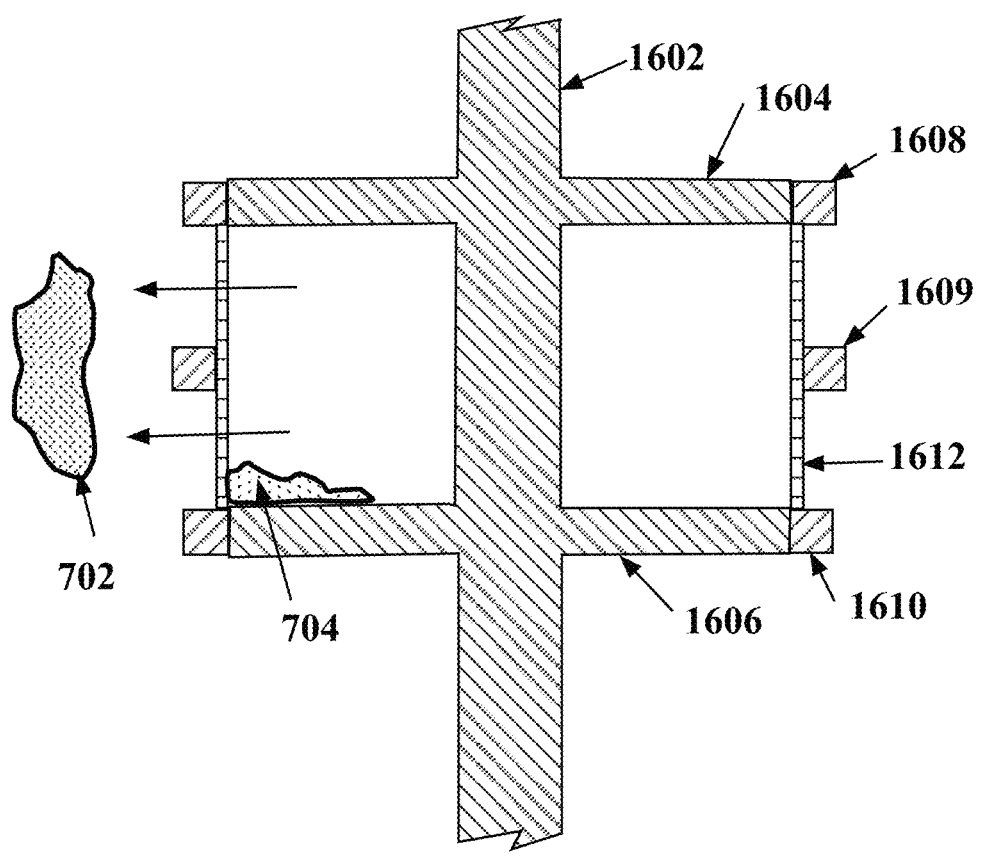
FIG. 22 is a cross section view of the fifth system.

FIG. 21 shows a fifth system 1600 which may be a double piston type of a separator. The fifth system 1600 may have a rotating main shaft 1602. The rotating main shaft 1602 may further have an attached a top piston 1604 and a bottom piston 1606. The fifth system 1600 may also include a filtering portion 1607 which may have a top band 1608, a bottom band 1610 and a screen 1612.

The screen 1612 may be made of any material and may be of sufficient strength to withstand centrifugal force and retain the solid particles. The screen may be supported by bands 1608, 1609 and 1610 as illustrated in FIG. 21. The screen 1612 may have openings or apertures, which may be dimensioned to retain the solid particles 704 and let the liquid 702 through, as shown in FIG. 21. For separation of oil from Athabasca oil sands, the aperture may have a diameter of approximately 0.40-1.50 mm, 0.45-1.35 mm, 0.80-1.30 mm, or 0.90-1.20 mm. As stated above, the aperture size may vary depending on the properties of the liquid-solid material and the efficiency of the separation may vary as a function of aperture size.

The attached top piston 1604 and bottom piston 1606 may be separated by a distance such that, in the closed position, the top piston 1604 is even with the top band 1608 of the filtering portion 1607, and the bottom piston 1606 is even with the bottom band 1610 of the filtering portion 1607.

Figure 23:
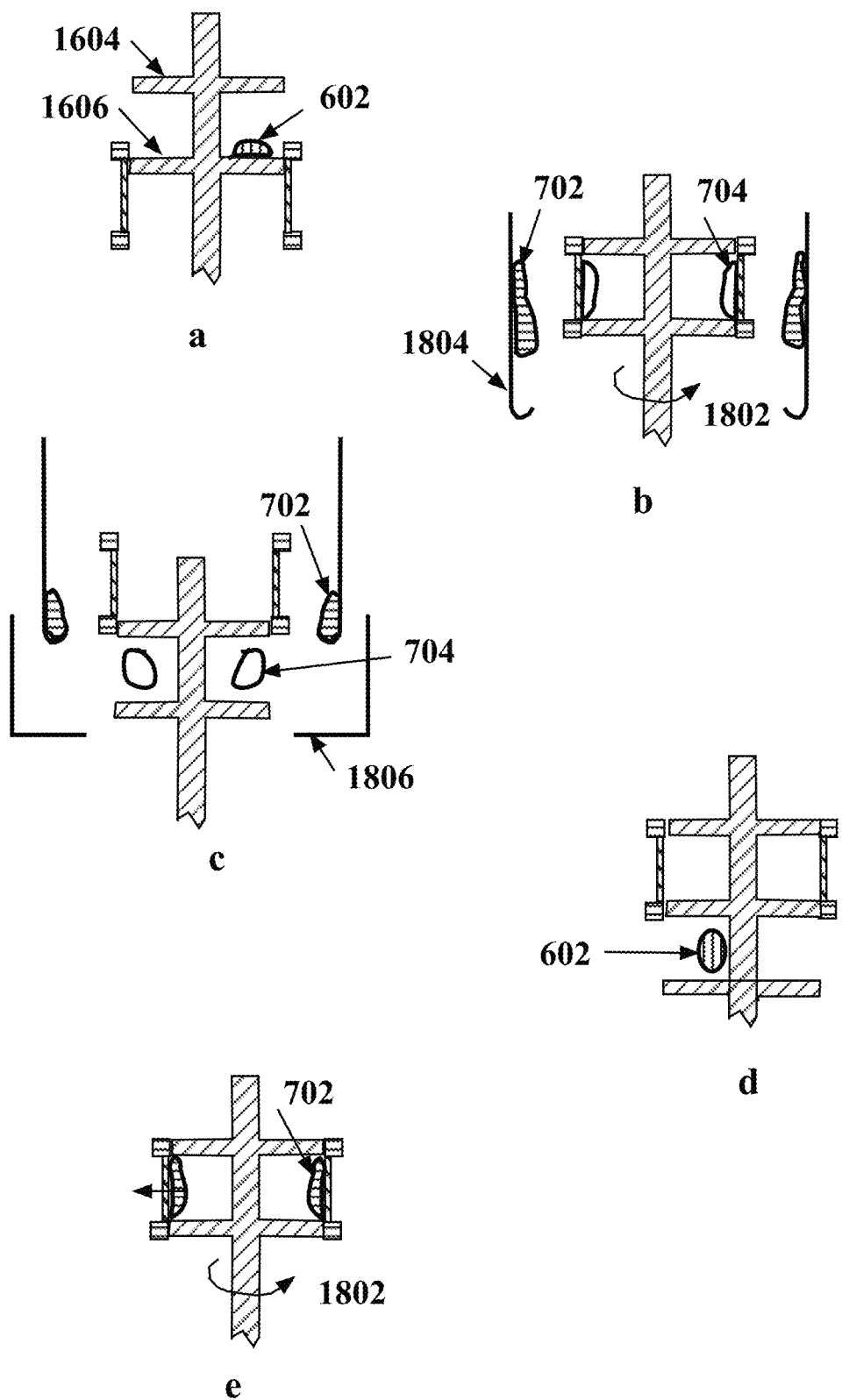
FIG. 23 is a cross-sectional view of an exemplary separation process in the fifth system.
Figure 24:
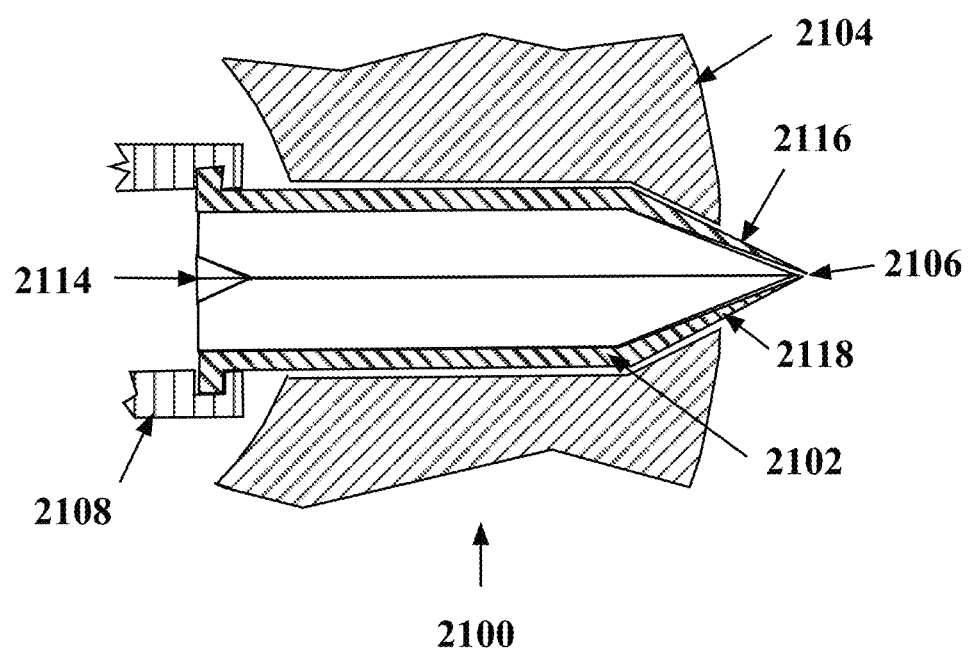
FIG. 24 is a cross-sectional view of a sixth system.

In operation, the top piston 1604 and bottom piston 1606 may be raised enough to introduce the solids-liquids mixture 602 as shown in the first step in FIG. 23. The pistons may be lowered and aligned with the filtering portion 1607. The apparatus may be spun, as shown in the second step 1802 in FIG. 23b. Heat may be applied to the mixture prior to loading or the apparatus may be heated before or during spinning.

During spinning the solid particles 704 may be restrained by the screen 1612; the liquid 702 may pass through the screen 1612 and may be captured by the liquid collector 1804.

After the spinning is completed and extraction has concluded, the apparatus may be cleaned as follows. The pistons may be lowered until the bottom edge of the top of the filter is even with the bottom edge of bottom band 1610, as shown in the third step in FIG. 23c. The solid particles may be removed from the piston by spinning such that the solid particles 704 leave the fifth system 1600 and are collected by a solid-particle collector 1806.

After cleaning, the process may be repeated. For example, a new batch of heated or unheated solids-liquids mixture 602 may be inserted into the double piston system, as shown in the fourth step in FIG. 23d.

While various systems of the invention have been described, it will be apparent to those of ordinary skill in the art that many more systems and implementations are possible that are within the scope of the invention.

Figure 26:
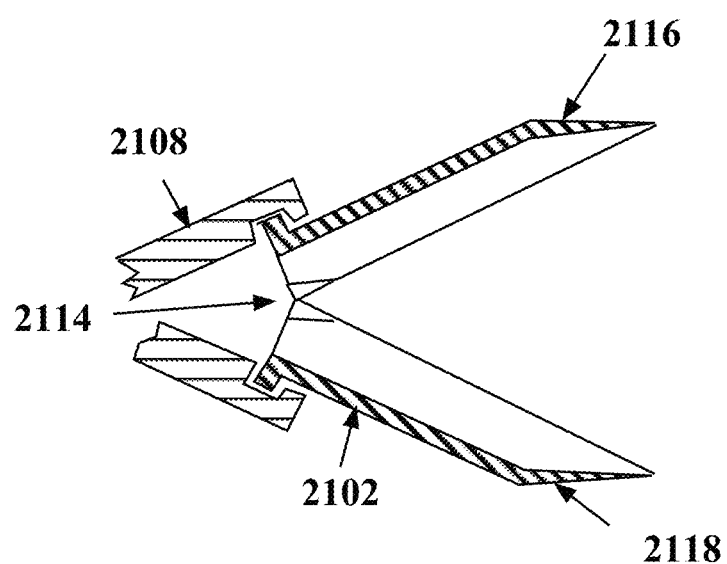
FIG. 26 is a cross-sectional view of the sixth system in an open conformation.
Figure 27:
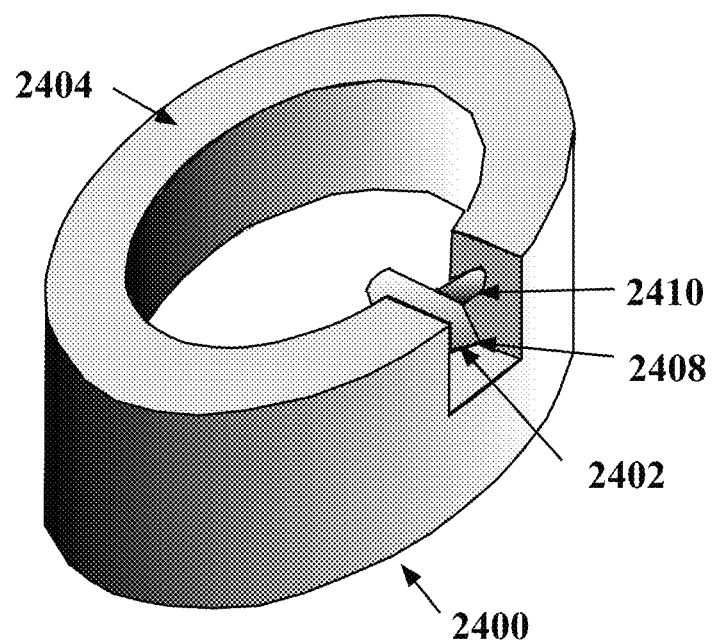
FIG. 27 is a perspective view of the seventh system.

FIG. 23 shows a cross sectional view of a sixth system 2100, which may be a centrifugal type of separator. The sixth system 2100 may have a rotor 2104. The rotor 2104 may spin a tube 2102. The sixth system 2100 may include multiple tubes 2102 depending on the size of the tube 2102 and the rotor 2104. The tube 2102, may include multiple parts. For example, the tube 2102 may have a first part 2216 and a second part 2118. The multiple parts may be connected, such as by a hinge 2114 or otherwise. When the first part 2116 and the second part 2118 are in contact, they may form a tube 2102. The tube 2102 may include an aperture 2106 at one end. The aperture 2106 may facilitate separation of liquids, such as oil or water, from solids, such as sand or shale, by retaining solids within the tube 2102. The sixth system 2100 may also include an extractor 2108. As shown in FIG. 26, the extractor 2108 may remove the tube 2102 from the rotor 2104, may split the tube 2102 into its first part 2116 and second part 2118, and may spin the tube 2102 to remove the solid particles.

Figure 25:
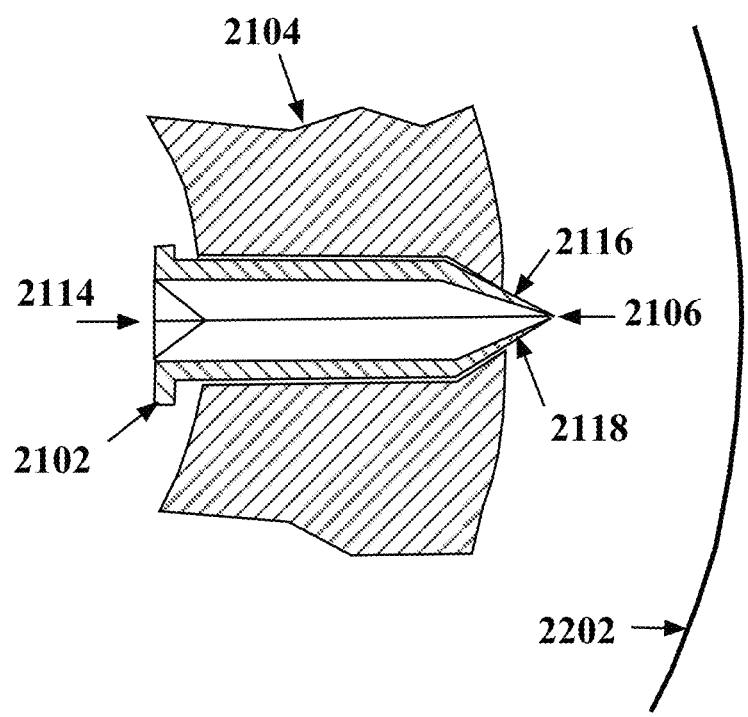
FIG. 25 is a cross-sectional view of the sixth system surrounded by a liquid collector.

The sixth system 2100 may include a liquid collector 2202, as shown in FIG. 25, which may be any shape capable of containing the liquid, such as a cylinder, rectangle, or hexagon.

The process for extracting liquids from solid particles may be adapted for the sixth system 2100, described above, by placing a solids-liquids mixture in the tube 2102, which may be placed in the rotor 2104. The solids-liquids mixture may be heated before, during, or after placement in the tube 2102. The solids-liquids mixture, for example oil shale or oil sands, may be heated to approximately 25° C.-200° C., 50° C.-175° C., 75° C.-150° C., 95° C.-125° C., and preferably approximately 92° C.-110° C. and more preferably approximately 94° C. (e.g., in a water bath). The tube 2102 may be inserted into the rotor 2104 and spun perpendicular to the long axis of the tube 2102. The tube 2102 may be spun to approximately 500 rpm to 10,000 rpm. Spinning may cause the liquid to separate from the solid particles. The tube 2102 may be spun for approximately 15 seconds to 20 minutes. The liquid may exit the aperture 2106 and may accumulate, for example, on the liquid collector 2202. The optimum aperture 2106 size for extracting oil from Athabasca oil sands may be, for example, approximately 0.40-1.50 mm, 0.45-1.35 mm, 0.80-1.30 mm, or preferably approximately 0.85-1.10 mm. The sixth system 2100 may then be reused with a new solids-liquids mixture.

Figure 28:
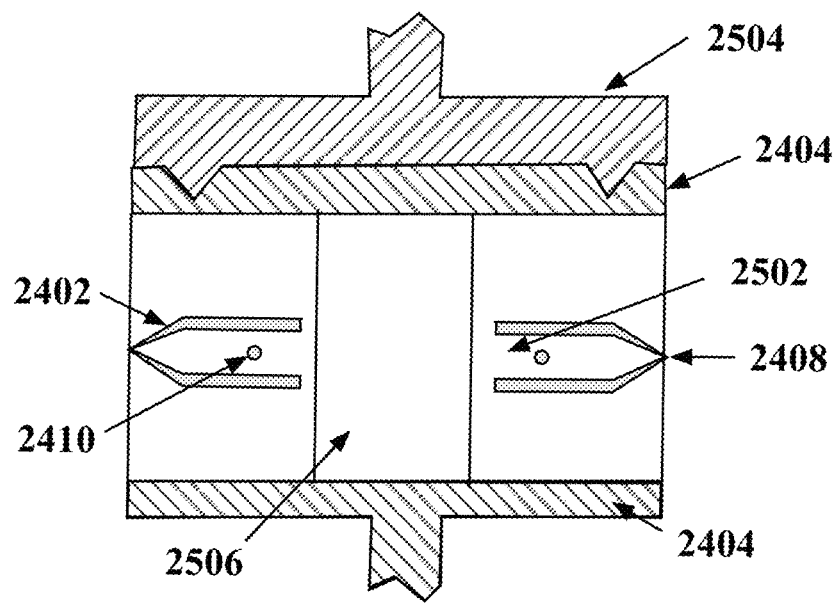
FIG. 28 is a cross-sectional view of the seventh system in a closed conformation.
Figure 29:
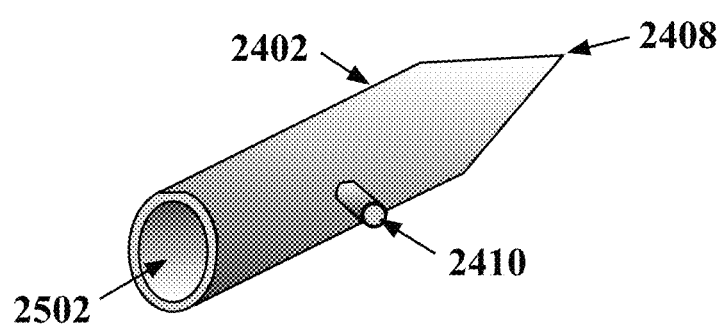
FIG. 29 is a perspective view of a component of the seventh system.

FIGS. 27-31 show a seventh system 2400 which may be a centrifugal type of separator. The seventh system 2400 may have a rotor with multiple parts. The first part of the rotor 2404 may attach to a power generator or other source of power. The first part of the rotor 2404 may have an axial opening 2506. The second part of the rotor 2504 may constrain the movement of a tube 2402 within the first part of the rotor 2404, as shown in FIG. 28, a cross-sectional view. The rotor 2404, 2504 may spin a tube 2402. The seventh system 2400 may include multiple tubes 2402 depending on the size of the tube 2402 and the rotor 2404, 2504. The tube 2402 may include one open end 2502, as shown in FIG. 28. The tube 2402 may include a smaller aperture 2408 at the other end. The aperture 2408 may facilitate separation of liquids, such as oil or water, from solids, such as sand or shale, by retaining solids within the tube 2402. The tube 2402 may also include a pivot point 2410, such as an axle, along the length of the tube 2402 that may be perpendicular to the tube length, as shown in FIG. 29.

Figure 30:
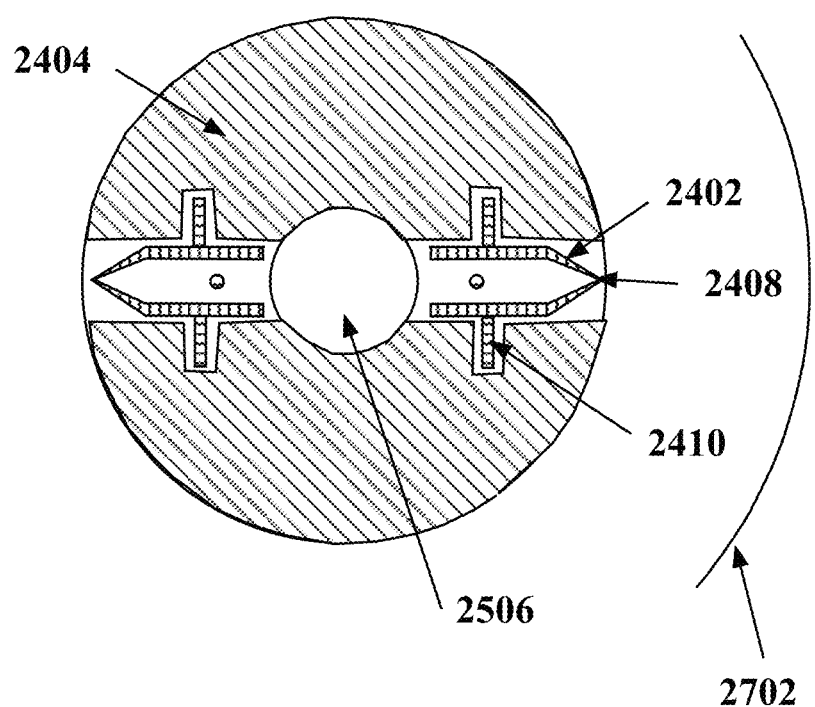
FIG. 30 is a cross-sectional view of the seventh system.
Figure 31:
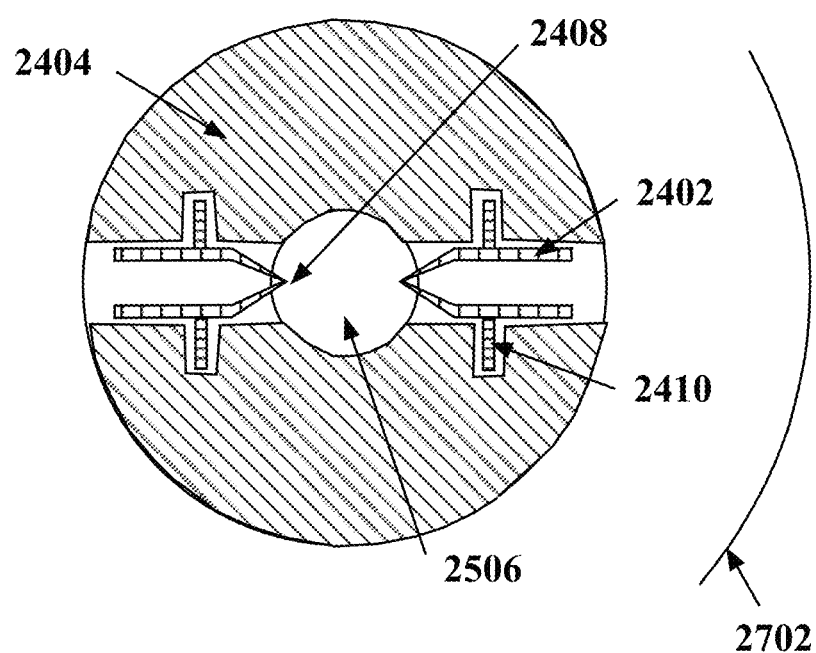
FIG. 31 is a second cross-sectional view of the seventh system.

The seventh system 2400 may include a liquid collector 2702, as shown in FIG. 30 and FIG. 31, which may be any shape capable of containing the liquid, such as a cylinder, rectangle, or hexagon.

The process for extracting liquids from solid particles may be adapted for the seventh system 2400, described above, by placing a solids-liquids mixture in the tube 2402, which may be placed in the first part of the rotor 2404 and secured in place by the second part of the rotor 2504. The solids-liquids mixture may be heated before, during, or after placement in the tube 2402. The solids-liquids mixture, for example oil shale or oil sands, may be heated to approximately 25° C.-200° C., 50° C.-175° C., 75° C.-150° C., 95° C.-125° C., and preferably approximately 92° C.-110° C. and more preferably approximately 94° C. (e.g., in a water bath). The tube 2402 may be inserted into the first part of the rotor 2404, as shown in FIG. 30, and spun perpendicular to the long axis of the tube 2402. The tube 2402 may be spun to approximately 500 rpm to 10,000 rpm. The tube 2402 may be spun for approximately 15 seconds to 20 minutes. Spinning may cause the liquid to separate from the solid particles. The liquid may exit the aperture 2408 and may accumulate, for example, on the liquid collector 2702. The optimum aperture 2408 size for extracting oil from Athabasca oil sands may be, for example, approximately 0.40-1.50 mm, 0.45-1.35 mm, 0.80-1.30 mm, or preferably approximately 0.85-1.10 mm. Once the liquid has left the tube 2402, the second part of the rotor 2504 may be moved to allow the tube 2402 to pivot along the pivot point 2410. If the tube 2410 is spun, the remaining solid particles may exit the open end 2502 of the tube 2402, as shown in FIG. 31. The liquid collector 2702 may be changed to collect the solid particles. The seventh system 2400 may then be reused with a new solids-liquids mixture.

Figure 32:
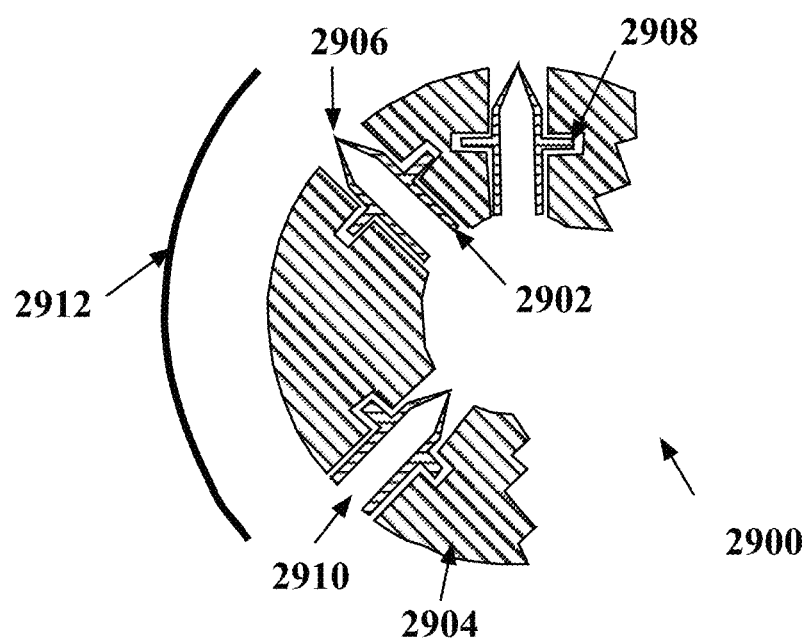
FIG. 32 is a partial cross-sectional view of the eighth system.

FIG. 32 shows an eighth system 2900, which may be a centrifugal type of separator. The eighth system 2900 may include a rotor 2904. The rotor 2904 may spin a tube 2902. The eighth system 2900 may include multiple tubes 2902 depending on the size of the tube 2902 and the rotor 2904. The tube 2902 may be open on one end 2910 and may include a smaller aperture 2906 at the other end. The aperture 2906 may facilitate separation of liquids, such as oil or water, from solids, such as sand or shale, by retaining solids within the tube 2902. The tube 2902 may include a lockable pivot point 2908, such as a geared axle, along the length of the tube that may be perpendicular to the tube length.

The eighth system 2900 may include a liquid collector 2912, as shown in FIG. 32, which may be any shape capable of containing the liquid, such as a cylinder, rectangle, or hexagon.

The process for extracting liquids from solid particles may be adapted for the eighth system 2900, described above, by placing a solids-liquids mixture in the tube 2902, which may be positioned within the rotor 2904 and secured in place by the lockable pivot point 2908. The solids-liquids mixture may be heated before, during, or after placement in the tube 2902. The solids-liquids mixture, for example oil shale or oil sands, may be heated to approximately 25° C.-200° C., 50° C.-175° C., 75° C.-150° C., 95° C.-125° C., and preferably approximately 92° C.-110° C. and more preferably approximately 94° C. (e.g., in a water bath). The rotor 2904 may spin the tube 2902 perpendicular to the long axis of the tube 2902. The tube 2902 may be spun to approximately 500 rpm to 10,000 rpm. The tube 2902 may be spun for approximately 15 seconds to 20 minutes. Spinning may cause the liquid to separate from the solid particles. The liquid may exit the aperture 2906 and may accumulate, for example, on the liquid collector 2912. The optimum aperture 2906 size for extracting oil from Athabasca oil sands may be, for example, approximately 0.40-1.50 mm, 0.45-1.35 mm, 0.80-1.30 mm, or preferably approximately 0.85-1.10 mm. Once the liquid has left the tube 2902, the lockable pivot point 2908 may allow the tube 2902 to pivot such that the remaining solid particles may exit the open end of the tube 2902 if it is spun. The liquid collector 2912 may be changed to collect the remaining solid particles. The eighth system 2900 may then be reused with a new solids-liquids mixture.

Figure 33:
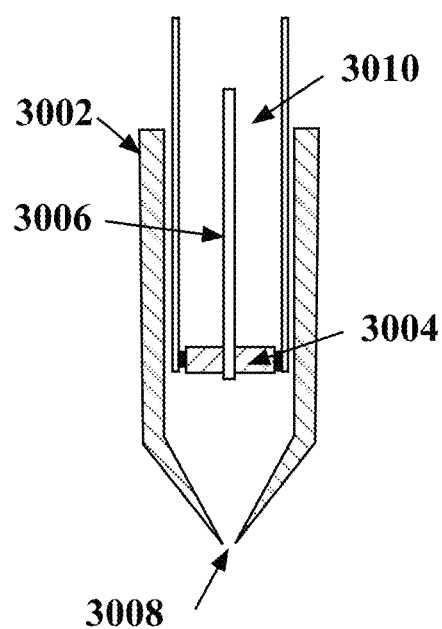
FIG. 33 is a first cross-sectional view of the ninth system.
Figure 34:
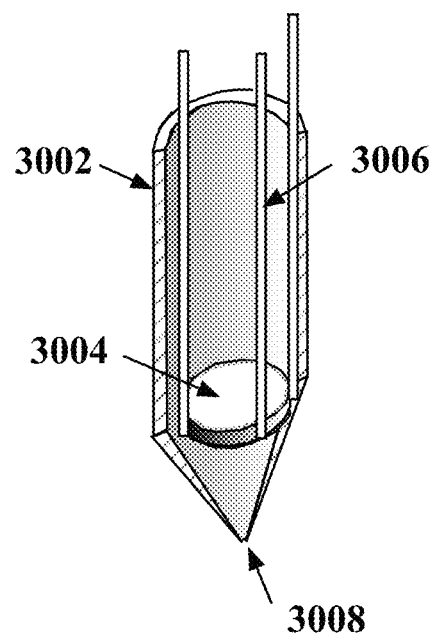
FIG. 34 is a second cross-sectional perspective view of the ninth system.
Figure 35:
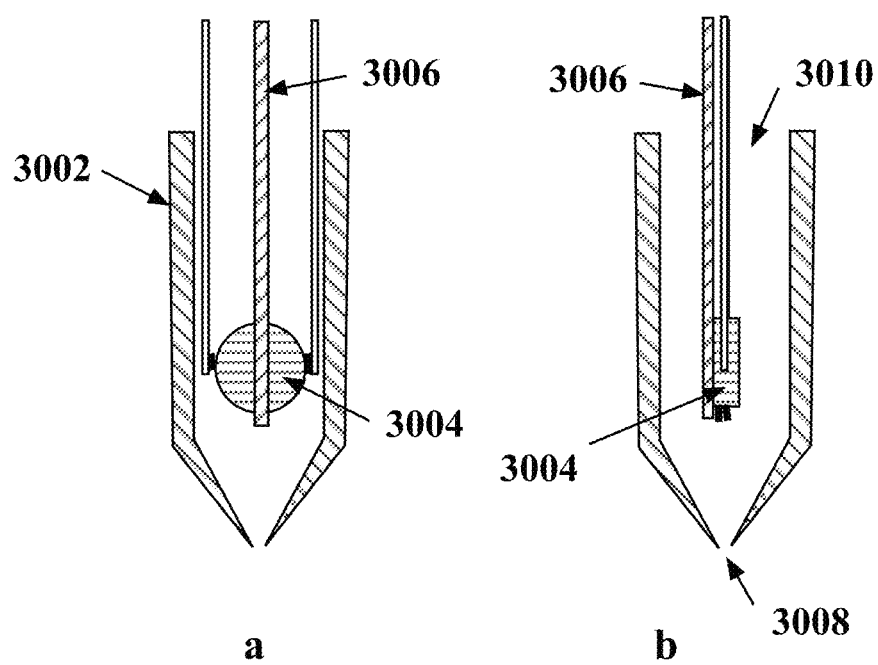
FIG. 35 is a third cross-sectional view of the ninth system.

FIG. 33 shows a ninth system 3000, which may be a centrifugal type of separator. An exemplary cross-sectional perspective view of the ninth system 3000 is shown in FIG. 34. The ninth system 3000 may include a tube 3002. The tube 3002 may be open on one end 3010. The tube 3002 may include a smaller aperture 3008 at the other end. The aperture 3008 may facilitate separation of liquids 3304, such as oil or water, from solid particles 3306, such as sand or shale, by retaining solid particles 3306 within the tube 3002 if it is spun. The ninth system 3000 may include a disk 3004. The disk 3004 may be contained within the tube 3002. The disk 3004 may be held in place such that the disk 3004 is perpendicular to the length of the tube 3002, as shown in FIG. 33 and FIG. 34. The disk 3004 may also be moved by rods 3006 such that the disk 3004 is parallel to the length of the tube 3002, as shown in the front view in FIG. 35*a* and in the side view in FIG. 35*b*.

Figure 36:
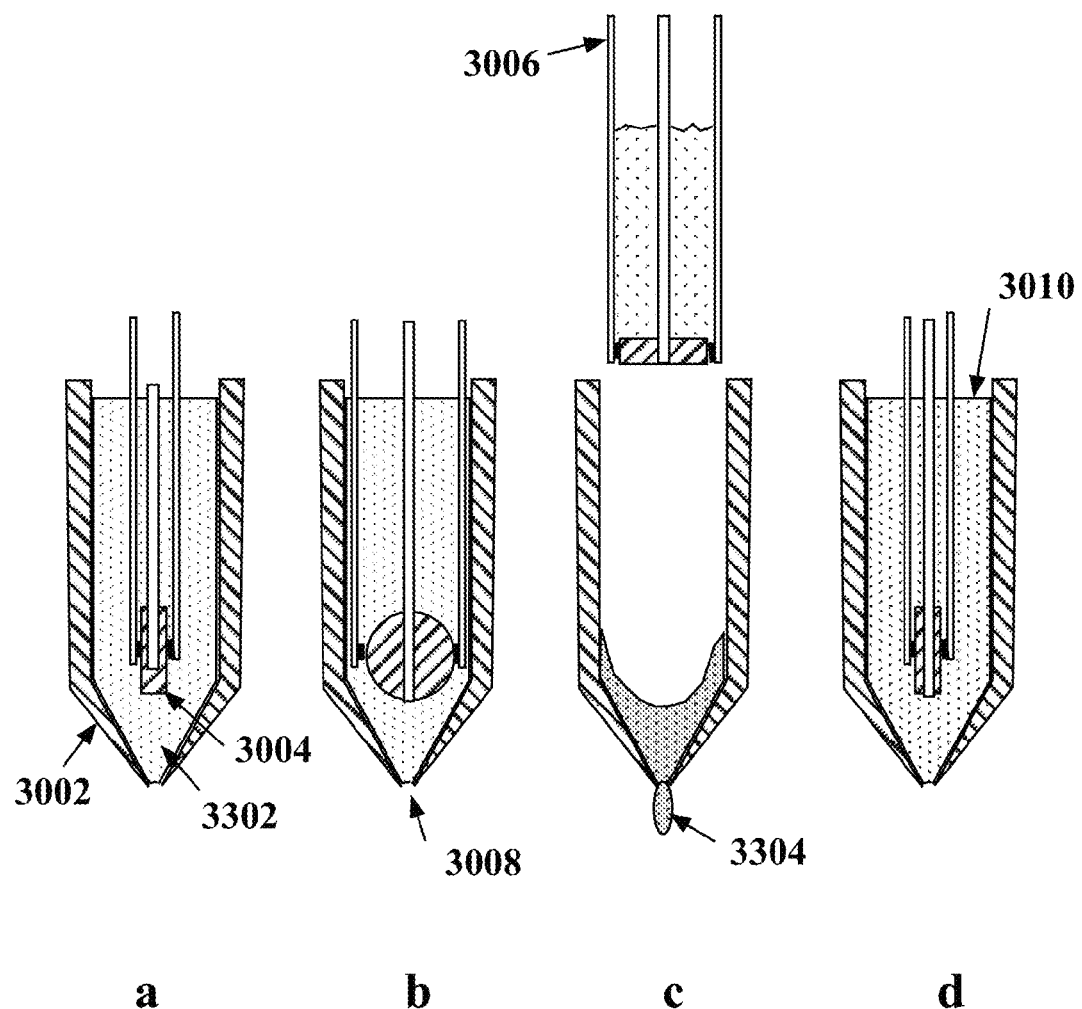
FIG. 36 is a fourth cross-sectional view of the ninth system.

The process for extracting liquids 3304 from solid particles 3306 may be adapted for the ninth system 3000, described above, by placing a solids-liquids mixture 3302 in the tube 3002 with the disk 3004 positioned parallel to the length of the tube 3002, as shown in front view in FIG. 36*a* and inside view in FIG. 36*b*. The solids-liquids mixture 3302 may be heated before, during, or after placement in the tube 3002. The solids-liquids mixture 3302, for example oil shale or oil sands, may be heated to approximately 25° C.-200° C., 50° C.-175° C., 75° C.-150° C., 95° C.-125° C., and preferably approximately 92° C.-110° C. and more preferably approximately 94° C. (e.g., in a water bath). Spinning the tube 3002 perpendicular to the long axis of the tube 3002 may cause the liquid 3304 to separate from the solid particles 3306. The tube 3002 may be spun to approximately 500 rpm to 10,000 rpm. The tube 3002 may be spun for approximately 15 seconds to 20 minutes. The liquid 3304 may exit the aperture 3008 for collection later. The optimum aperture 3008 size for extracting oil from Athabasca oil sands may be, for example, approximately 0.40-1.50 mm, 0.45-1.35 mm, 0.80-1.30 mm, or preferably approximately 0.85-1.10 mm. Once the liquid 3304 has left the tube 3002, the disk 3004 may be repositioned perpendicular to the length of the tube 3002 and removed from the tube 3002, as shown in FIG. 36*c*, extracting the remaining solid particles 3306 as it is removed. The ninth system 3000 may then be reused with a new solids-liquids mixture 3302, as shown in FIG. 36*d*.

Figure 37:
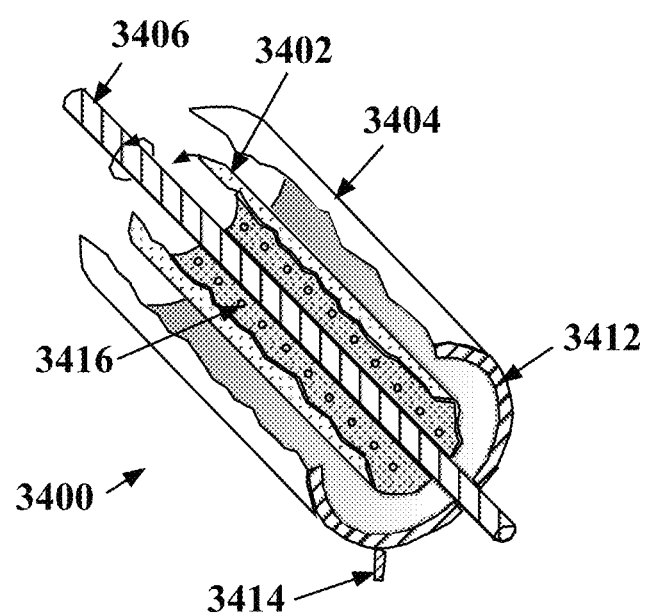
FIG. 37 is a perspective and cross-sectional view of the tenth system.
Figures 38, 38A:
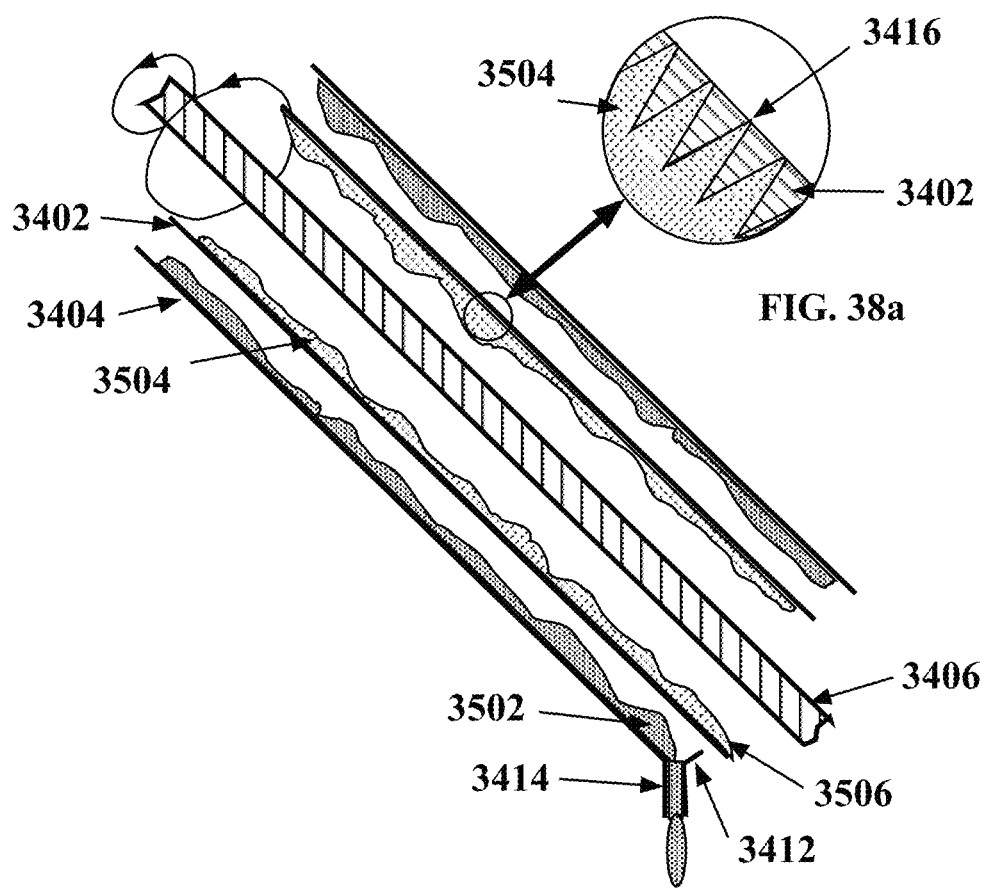
FIG. 38 is a cross-sectional view of the tenth system.

FIGS. 37-38 show a tenth system 3400, which may have a cylindrical formation. The tenth system 3400 may include a shaft 3406. The shaft 3406 may be placed within a first cylinder 3402. The shaft 3406 may be angled to allow the movement of a solids-liquids mixture 3504 down the inside of the first cylinder 3402 by gravity. The first cylinder 3402 may include apertures 3416. An exploded exemplary view of the first cylinder 3402 including apertures 3416 is illustrated in FIG. 38*a*. The apertures 3416 may facilitate the separation of liquids 3502, such as oil or water, from solids, such as sand or shale, by retaining solid particles 3506 within the first cylinder 3402. The first cylinder 3402 may be placed within a second cylinder 3404. As shown in FIG. 37, the second cylinder 3404 may include a protrusion 3412. The protrusion 3412 may collect and direct the liquid 3502 to a collection point 3414.

The process for extracting liquids 3502 from solid particles 3506 may be adapted for the tenth system 3400, described above, by placing a solids-liquids mixture 3504 on the inside of the spinning first cylinder 3402 and allowing it to travel along the surface of the first cylinder 3402 by gravity. The solids-liquids mixture 3504 may be heated before, during, or after placement in the first cylinder 3402. The solids-liquids mixture 3504, for example oil shale or oil sands, may be heated to approximately 25° C.-200° C., 50° C.-175° C., 75° C.-150° C., 95° C.-125° C., and preferably approximately 92° C.-110° C. and more preferably approximately 94° C. (e.g., in a water bath). Spinning the first cylinder 3402 may cause the liquid 3502 to separate from the solid particles 3506. The first cylinder 3402 may be spun to approximately 500 rpm to 10,000 rpm. The first cylinder 3402 may be spun for approximately 15 seconds to 20 minutes. The liquid 3502 may exit the first cylinder 3402 through the apertures 3416. The optimum aperture 3416 size for extracting oil from Athabasca oil sands may be, for example, approximately 0.40-1.50 mm, 0.45-1.35 mm, 0.80-1.30 mm, or preferably approximately 0.85-1.10 mm. The liquid 3502 may accumulate on the second cylinder 3404 and may be contained by the protrusion 3412 and drained at the collection point 3414. A person skilled in the art may be able to adjust the angle of the first cylinder 3402, the rotational rate of the first cylinder 3402, and the feed rate of the solids-liquids mixture 3504 such that a majority of the liquid 3502 may be removed by the time the solids-liquids mixture 3504 reaches the lower end of the first cylinder 3402. The tenth system 3400 may be used in a continuous process.

Figure 39:
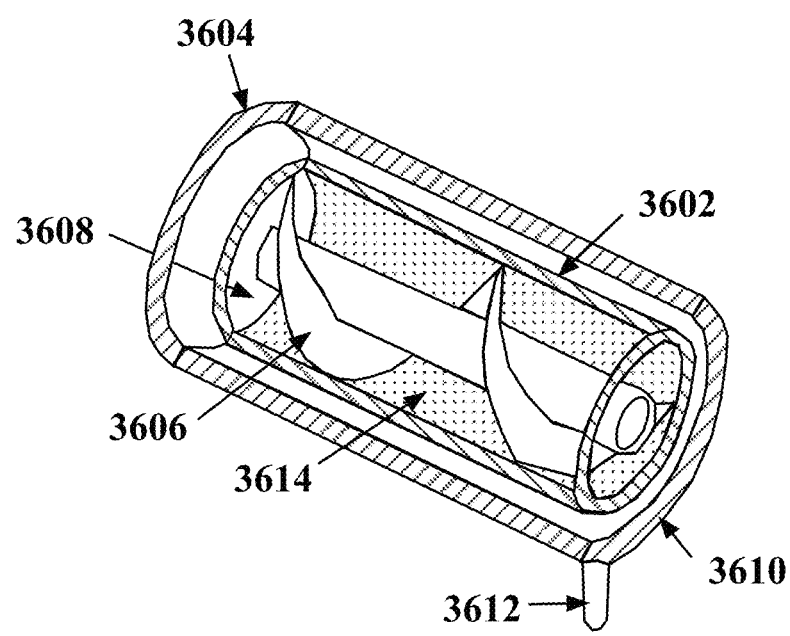
FIG. 39 is a perspective view of the eleventh system.
Figure 40:
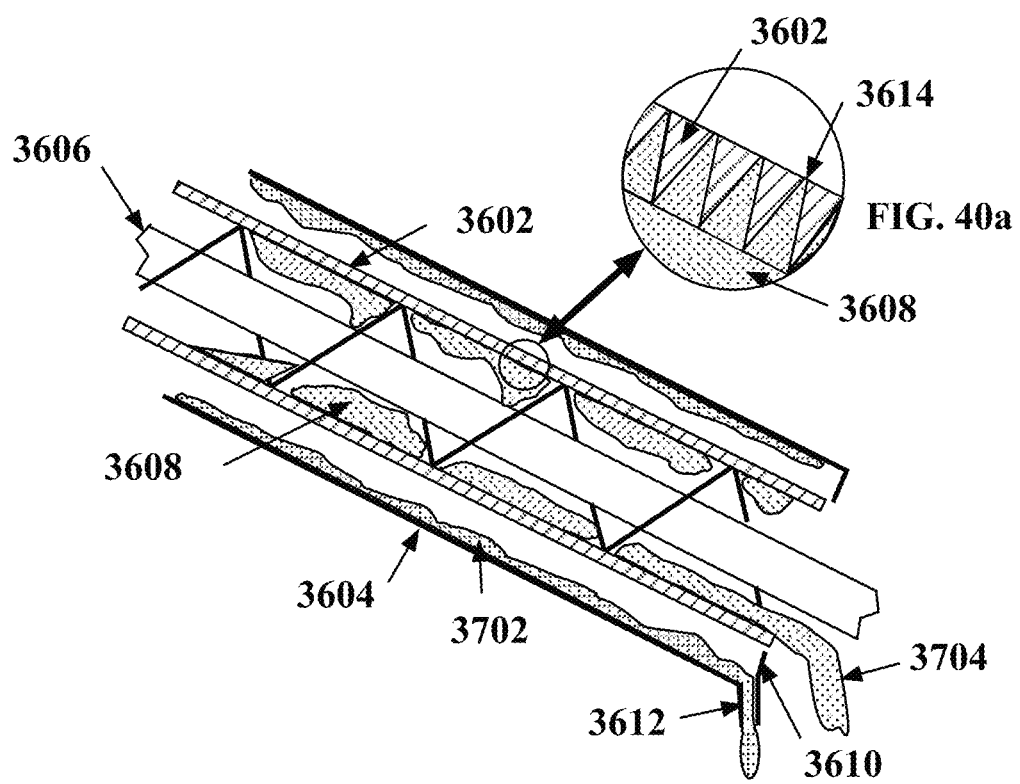
FIG. 40 is a first cross-sectional view of the eleventh system.

FIGS. 39-40 show an eleventh system 3600, which may have a cylindrical formation. The eleventh system 3600 may include a rotating screw shaft 3606. The rotating screw shaft 3606 may be placed within a first cylinder 3602. The rotating screw shaft 3606 may facilitate the separation of liquids 3702, such as oil or water, from solids 3704, such as sand or shale, by retaining solids 3704 within the first cylinder 3602. The first cylinder 3602 may include apertures 3614. An exploded exemplary view of the first cylinder 3602 including apertures 3614 is illustrated in FIG. 40a. The apertures 3614 may facilitate the separation of liquids 3702, such as oil or water, from solids 3704, such as sand or shale, by retaining solids 3704 within the first cylinder 3602. The first cylinder 3602 may be placed within a second cylinder 3604. As shown in FIG. 40, the second cylinder 3604 may include a protrusion 3610. The protrusion 3610 may collect and direct the liquid to a collection point 3612.

The process for extracting liquids 3702 from solid particles 3704 may be adapted for the eleventh system 3600, described above, by placing a solids-liquids mixture 3608 on the inside of the spinning first cylinder 3602 and using the rotating screw shaft 3606 to move the solids-liquids mixture 3608 along the inner surface of the first cylinder 3602. The solids-liquids mixture 3608 may be heated before, during, or after placement in the first cylinder 3602. The solids-liquids mixture 3608, for example oil shale or oil sands, may be heated to approximately 25° C.-200° C., 50° C.-175° C., 75° C.-150° C., 95° C.-125° C., and preferably approximately 92° C.-110° C. and more preferably approximately 94° C. (e.g., in a water bath). Spinning the first cylinder 3602 may cause the liquid 3702 to separate from the solids 3704. The first cylinder 3602 may be spun to approximately 500 rpm to 10,000 rpm. The first cylinder 3602 may be spun for approximately 15 seconds to 20 minutes. The liquid 3702 may exit the first cylinder 3602 through the apertures 3614. The optimum aperture 3614 size for extracting oil from Athabasca oil sands may be, for example, approximately 0.40-1.50 mm, 0.45-1.35 mm, 0.80-1.30 mm, or preferably approximately 0.85-1.10 mm. The liquid 3702 may accumulate on the second cylinder 3604 and may be contained by the protrusion 3610 and drained at the collection point 3612. A person skilled in the art may be able to adjust the rotational rate of the screw shaft 3606, the feed rate of the solids-liquids mixture 3608, and the rotational rate of the first cylinder 3602 such that a majority of the liquid 3702 may be removed by the time the solids-liquids mixture 3608 reaches the end of the first cylinder 3602. The eleventh system 3600 may be used in a continuous process.

Figure 41:
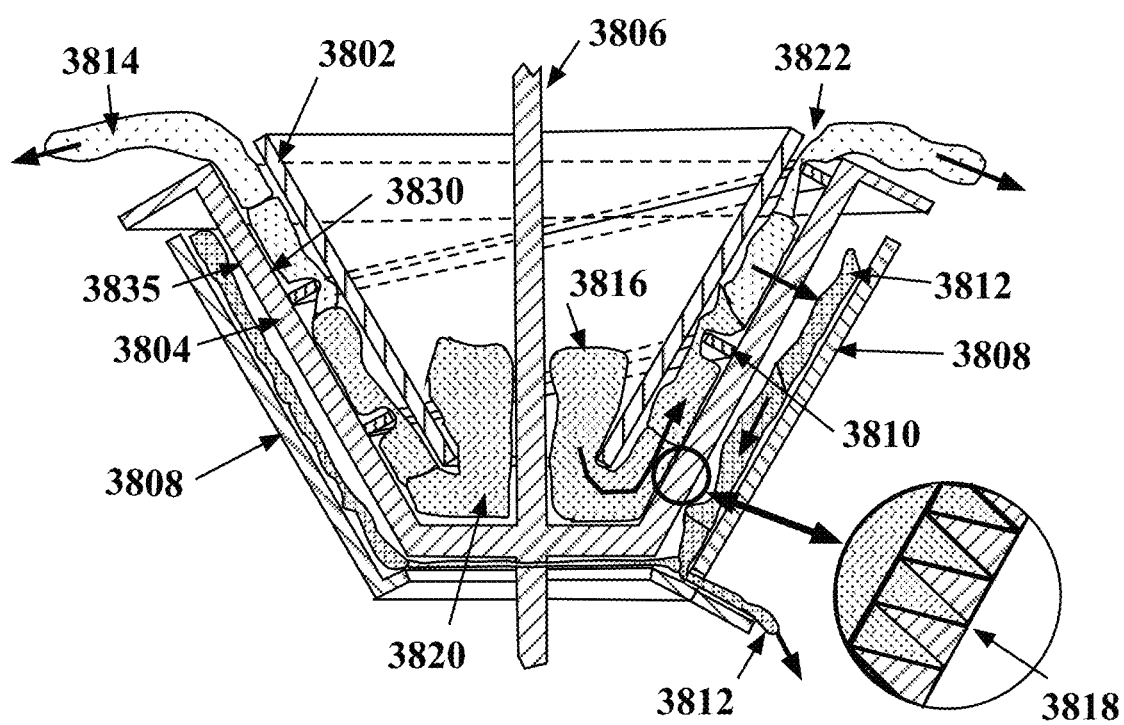
FIG. 41 is a second cross-sectional view of the twelfth system.

FIG. 41 shows a cross sectional view of a twelfth system 3800, which may which may have a cyclone formation. The twelfth system 3800 may include a first cone 3802 and a second cone 3804, placed concentrically around a shaft 3806. The first cone 3802 placed inside the second cone 3804, e.g., the first cone 3802 closest to the shaft 3806. The second cone 3804 may have an interior face 3830 and an exterior face 3835. The interior face 3830 may include baffles 3810 protruding therefrom. The baffles 3810 may be arranged in a screw-thread-like fashion on the interior face 3830 of the second cone 3804, in the space between the first cone 3802 and the second cone 3804. The second cone 3804 may include apertures 3818. An exploded exemplary view of the second cone 3804 including apertures 3818 is illustrated in FIG. 41a. The apertures 3818 may facilitate the separation of liquids 3812, such as oil or water, from solid particles 3814, such as sand or shale, by retaining solid particles 3814, within the second cone 3804. The twelfth system 3800 may also include a liquid collector 3808. The liquid collector 3808 may surround the second cone 3804. For example, the second cone 3804 may be nested within the liquid collector 3808.

The process for extracting liquids 3812 from solid particles 3814 may be adapted for the twelfth system 3800, described above, by placing a solids-liquids mixture 3816 within the cavity of the first cone 3802 and feeding it into the space 3820 between the first cone 3802 and second cone 3804. The solids-liquids 3816 mixture may be heated before, during, or after placement in the first cone 3802. The solids-liquids mixture 3816, for example oil shale or oil sands, may be heated to approximately 25° C.-200° C.; 50° C.-175° C., 75° C.-150° C., 95° C.-125° C., and preferably approximately 92° C.-110° C. and more preferably approximately 94° C. (e.g., in a water bath). The process to feed the solids-liquids mixture 3816 into the space between the first cone 3802 and second cone 3804 may include, by way of example, gravity, compressed air, an auger, a piston, and a plunger. The solids-liquids mixture 3816 may travel up the inside surface of the spinning second cone 3804 by centrifugal force, by the action of the baffles 3810, or by suction force. Spinning the second cone 3804 may cause the liquid 3812 to separate from the solid particles 3814. The second cone 3804 may be spun to approximately 500 rpm to 10,000 rpm. The second cone 3804 may be spun for approximately 15 seconds to 20 minutes. The liquid 3812 may exit the second cone 3804 through the apertures 3818 and may be collected on the liquid collector 3808. The optimum aperture 3818 size for extracting oil from Athabasca oil sands may be, for example, approximately 0.40-1.50 mm, 0.45-1.35 mm, 0.80-1.30 mm, or preferably approximately 0.85-1.10 mm. The remaining solid particles 3814 may exit space 3822 between the first cone 3802 and second cone 3804 near the top of the second cone 3804. A person skilled in the art may be able to adjust the angle of the first cone 3802 and second cone 3804, the rotational rate of the second cone 3804, the feed rate of the solids-liquids mixture 3816, and the placement of the baffles 3810 such that a majority of the liquid 3812 may be removed by the time the solids-liquids mixture 3816 reaches the top of the second cone 3804. The twelfth system 3800 may be used in a continuous process.

Figure 42:
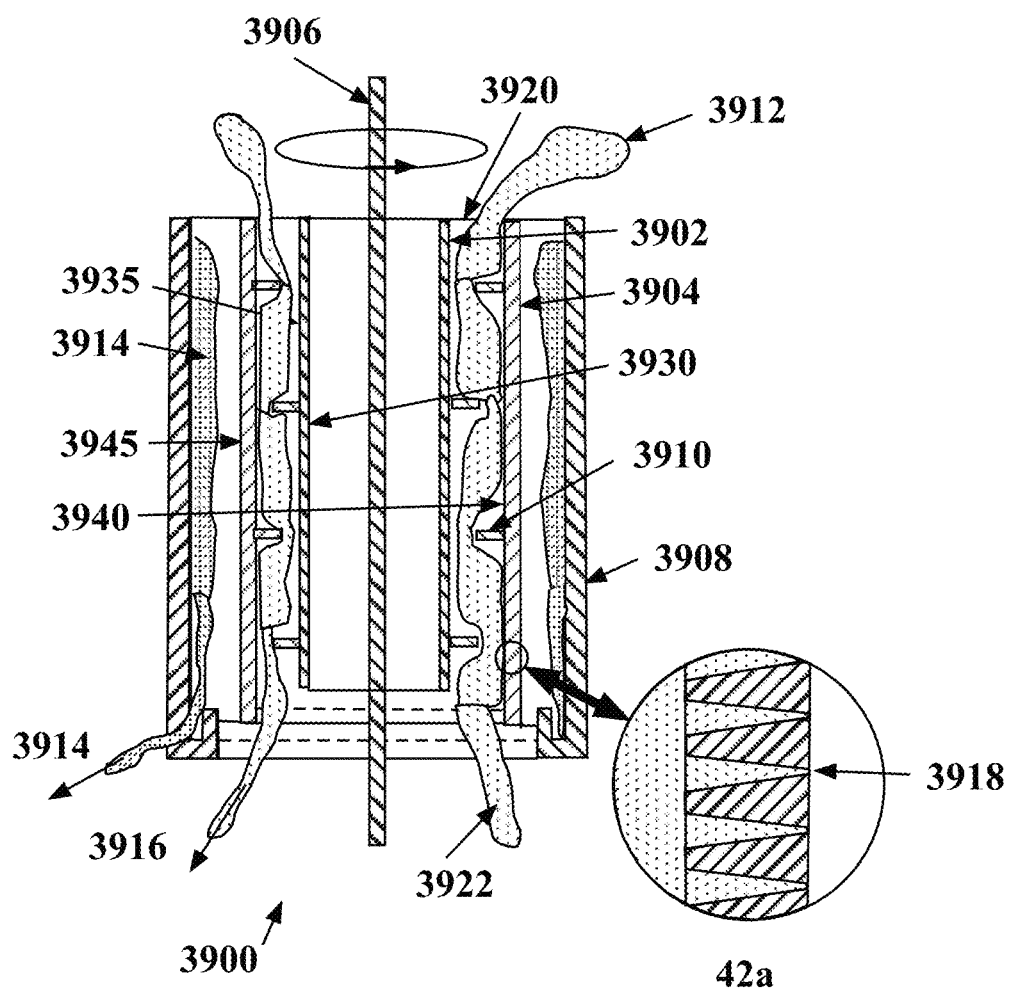
FIG. 42 is a cross-sectional view of the thirteenth system.

FIG. 42 shows a cross sectional view of a thirteenth system 3900, which may include a cylindrical formation. The thirteenth system may include a vertical first cylinder 3902 and a vertical second cylinder 3904, placed concentrically around a shaft 3906. The first cylinder 3902 may have a first face 3930 and a second face 3935. The second face 3935 of the first cylinder 3902 may have baffles 3910 protruding therefrom. The second cylinder 3904 may have a first face 3940 and a second face 3945. The first face 3940 of the second cylinder 3904 may have baffles 3910 protruding therefrom. The first face 3940 of the second cylinder 3904 may be positioned facing the second face 3935 of the first cylinder 3902.

The baffles 3910 may be positioned in the space between the first cylinder 3902 and the second cylinder 3904. The baffles 3910 may control the movement of a solids-liquids mixture 3912. The second cylinder 3904 may include apertures 3918. An exploded exemplary view of the second cylinder 3904 including apertures 3918 is illustrated in FIG. 42 *a*. The apertures 3918 may facilitate the separation of liquids 3914, such as oil or water, from solid particles 3916, such as sand or shale, by retaining solid particles 3916 within the second cylinder 3904. The twelfth system may also include a liquid collector 3908. The apertures 3918 may be dimensioned as shown and described in FIG. 3. The liquid collector 3908 may surround the second cylinder 3904. For example, the second cylinder 3904 may be nested within the liquid collector 3908.

The process for extracting liquids 3914 from solid particles 3916 may be adapted for the thirteenth system 3900, described above, by placing a solids-liquids mixture 3912 in the space 3920 between the rotating first cylinder 3902 and rotating second cylinder 3904. The solids-liquids mixture 3912 may be heated before, during, or after placement in the space between the first cylinder 3902 and second cylinder 3904. The solids-liquids mixture 3912, for example oil shale or oil sands, may be heated to approximately 25° C.-200° C., 50° C.-175° C., 75° C.-150° C., 95° C.-125° C., and preferably approximately 92° C.-110° C. and more preferably approximately 94° C. (e.g., in a water bath). The size and placement of the baffles 3910 may adjust the movement of the solids-liquids mixture 3912. Spinning the first cylinder 3902 and second cylinder 3904 may cause the liquid 3914 to separate from the solid particles 3916. The first cylinder 3902 and second cylinder 3904 may be spun to approximately 500 rpm to 10,000 rpm. The second cylinder 3904 may be spun for approximately 15 seconds to 20 minutes. The liquid 3914 may exit the second cylinder 3904 through the apertures 3918 and may be collected on the liquid collector 3908. The optimum aperture 3918 size for extracting oil from Athabasca oil sands may be, for example, approximately 0.40-1.50 mm, 0.45-1.35 mm, 0.80-1.30 mm, or preferably approximately 0.85-1.10 mm. The remaining solid particles 3916 may exit the space 3922 between the first cylinder 3902 and second cylinder 3904 near the bottom of the second cylinder 3904 alternatively or additionally, the remaining solid particles 3916 may exit the space 3922 between the first cylinder 3902 and the second cylinder 3904 near or at the top of the second cylinder 3904. The space 3922 between the first cylinder 3902 and the second cylinder 3904 that may allow the solid particles to exit may be continuous. A person skilled in the art may be able to adjust the rotational rate of the first cylinder 3902 and second cylinder 3904, the feed rate of the solids-liquids mixture 3912, and the placement of the baffles 3910 such that a majority of the liquid 3914 may be removed by the time the solids-liquids mixture 3912 reaches the bottom of the second cylinder 3904. The thirteenth system 3900 may be used in a continuous process.

A method for separating oil from oil sands comprising: heating the oils sands; spinning the heated oil sands; confining mechanically sand particles present in the oils sands away from the oil; and recovering the oil substantially free of the sand. Further, the oil sands heated to approximately 25-200 degrees C. The oils sands heated to approximately 92 degrees C. to 110 degrees C. The particles are confined away from the oil by an aperture. The aperture is about 0.40 to about 1.5 mm in diameter. The aperture is about 0.80 to about 1.20 mm in diameter. The oil sands are subjected to centrifugal force. The oil is extracted from the oil sands without the use of chemicals.

A separation device for separating liquids from a solid particulate material, the separation device comprising: a structure for confining the sand particles, a structure for recovering the oil; and where the separation device is subjected to centrifugal force.

A separation device for separating liquids from a solid particulate material, the separation device comprising: a structure for confining the sand particles, a structure for recovering the oil; and where the separation device is subjected to centrifugal force. The structure for confining sand particles comprises a first tube and a second tube; the first tube and the second tube being dimensioned such that the first tube fits inside the second tube; the first tube including at least one aperture sized smaller than the oil sand; the first tube for confining the sand particles mechanically; and the second tube for recovering the oil.

A separation device for separating liquids from a solid particulate material, the separation device comprising: a structure for confining the sand particles, a structure for recovering the oil; and where the separation device is subjected to centrifugal force. The structure for confining the particles has a clam shell formation including a first portion and a second portion; the first portion and the second portions being dimensioned to fit together with an aligning pivot; the first portion including at least one cavity; the second portion including at least one cavity that mirrors the cavity of the first portion; and where, when the first portion and the second portion are fit together, the cavity in the first portion and the cavity in the second portion align to form one cavity; and the cavities terminate to form an aperture through which oil escapes; and the aperture is dimensioned to confine the sand particles within the cavity.

A separation device for separating liquids from a solid particulate material, the separation device comprising: a structure for confining the sand particles, a structure for recovering the oil; and where the separation device is subjected to centrifugal force. The structure for confining the particles has a conical formation with one or more walls, the walls including apertures, the walls also including baffles located along the interior of the conical separator, the baffles being continuous and arranged radially, and wherein the separation device further comprises a structure for recovering the oil.

A separation device for separating liquids from a solid particulate material, the separation device comprising: a structure for confining the sand particles, a structure for recovering the oil; and where the separation device is subjected to centrifugal force. The structure for confining the particles includes three or more planes, the planes being freely rotatable about a central axis; the central axis having a pivot; the planes being oriented so that they form walls of a closed chamber when rotated to a closed formation; the planes further including apertures through which oil escapes; and a structure for recovering oil.

A separation device for separating liquids from a solid particulate material, the separation device comprising: a structure for confining the sand particles, a structure for recovering the oil; and where the separation device is subjected to centrifugal force. A rotating main shaft; a top piston and a bottom piston removably attached to the main shaft; a filtering portion; the filtering portion having a top band, a bottom band, and a screen; the screen having apertures through which oil escapes; the screen, the top piston, and the bottom piston being arranged such that the pistons may be raised or lowered out of the plane of the screen.

A system for separating oil from oil sands comprising a source of centrifugal force; a heat source; a separation device; and a recovery device.

Through a simple mechanical method, the physical process disclosed for separating liquids from solids uses no water or other solvents and less than 190 cubic feet of natural gas to produce one barrel of bitumen. Minimizing the environmental impact, the disclosed process produces a clean affluent with the sole ingredient of sand. In comparison to the conventional method, the physical process disclosed requires fewer natural resources and less than 25% of the energy of the amount required in the conventional hot-water process to separate oil from oil sands. Further, on a laboratory scale, the disclosed method effectively separates over 85% of the available oil in less than 15 minutes.

I claim:

1. A separation device for separating oil from oil sands, the separation device comprising:
   a centrifugal force generator;
   a sand confining structure operably connected to the centrifugal force generator;
   the sand confining structure having a cone shape;
   the sand confining structure having a top and a bottom;
   the top of the sand confining structure dimensioned larger than the bottom of the sand confining structure;
   the sand confining structure comprising an interior face and an exterior face;
   a baffle protruding from the interior face of the sand confining structure;
   the sand confining structure nested within collecting portion;
   the sand confining structure further comprising apertures there through;
   the apertures having an origination point on the interior face of the sand confining structure and a termination point on the exterior face of the sand confining structure;
   the aperture having a diameter; and
   the diameter of the aperture at the origination point greater than the diameter of the aperture at the termination point.

2. The device of claim 1 wherein the baffle is arranged radially.

3. The device of claim 1 wherein the baffle is continuous with the interior face of the sand confining structure.

4. The device of claim 1 wherein the baffle is arranged in a screw-thread fashion.

5. The device of claim 1 wherein the oil recovering structure is stationary and wherein the sand confining structure is rotatable.

6. A method of separating oil from oil sands, the method comprising the steps of:
   (a) providing a device for separating oil from oil sands; the device comprising:
      a sand confining structure;
      the sand confining structure having a cone shape;
      the sand confining structure having a top and a bottom;
      the top of the sand confining structure dimensioned larger than the bottom of the sand confining structure;
      the sand confining structure comprising an interior face and an exterior face;
      a baffle protruding from the interior face of the sand confining structure;
      the sand confining structure nested within collecting portion;
      the sand confining structure further comprising apertures;
      the apertures having an origination point on the interior face of the sand confining structure and termination point on the exterior face of the sand confining structure;
      the aperture having a diameter;
      the diameter of the aperture at the origination point greater than the diameter of the aperture at the termination point;
   (b) loading oil sands into the confining structure, the oil sands comprising a sand component and an oil component;
   (c) providing a centrifugal force;
   (d) rotating the sand confining structure co-axially; and
   (d) collecting the sand component from the top of the sand confining structure.

7. The method of claim 6, further comprising rotating the sand confining structure co-axially at 500 rpm to 10,000 rpm.

* * * * *